United States Patent
Nakashima

(10) Patent No.: US 8,193,777 B2
(45) Date of Patent: Jun. 5, 2012

(54) NON-AQUEOUS ELECTROLYTE SECONDARY BATTERY CHARGING METHOD, ELECTRONIC DEVICE, BATTERY PACK, AND CHARGING DEVICE

(75) Inventor: Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 12/519,287

(22) PCT Filed: Dec. 11, 2007

(86) PCT No.: PCT/JP2007/073865
§ 371 (c)(1),
(2), (4) Date: Jun. 15, 2009

(87) PCT Pub. No.: WO2008/078552
PCT Pub. Date: Jul. 3, 2008

(65) Prior Publication Data
US 2010/0072951 A1    Mar. 25, 2010

(30) Foreign Application Priority Data

Dec. 26, 2006 (JP) .................................. 2006-349461

(51) Int. Cl.
*H02J 7/04* (2006.01)
*H02J 7/16* (2006.01)
(52) U.S. Cl. ......... 320/141; 320/147; 320/157; 320/159
(58) Field of Classification Search ................... 320/131, 320/141, 147, 157, 159, DIG. 17
See application file for complete search history.

(56) References Cited

U.S. PATENT DOCUMENTS

| 5,442,274 A | 8/1995 | Tamai |
| 5,945,811 A * | 8/1999 | Hasegawa et al. ............ 320/141 |
| 6,043,631 A * | 3/2000 | Tsenter ......................... 320/148 |
| 2002/0075003 A1* | 6/2002 | Fridman et al. ............... 324/426 |

FOREIGN PATENT DOCUMENTS

| JP | 4-123771 | 4/1992 |
| JP | 6-113474 | 4/1994 |
| JP | 7220759 | * 8/1995 |
| JP | 2002-354696 | 12/2002 |
| JP | 3371301 | 1/2003 |
| JP | 2004-199933 | 7/2004 |
| JP | 2004-327331 | 11/2004 |

* cited by examiner

Primary Examiner — Samuel Berhanu
(74) Attorney, Agent, or Firm — McDermott Will & Emery LLP

(57) ABSTRACT

The present invention aims to quickly charge a non-aqueous electrolyte secondary battery including a heat-resistant layer between a negative electrode and a positive electrode. A method according to the present invention for charging a non-aqueous electrolyte secondary battery including a heat-resistant layer between a negative electrode and a positive electrode is provided with a step of performing pulse charge on the secondary battery, a step of detecting a change amount of a cell voltage associated with a change in the concentration polarization of the non-aqueous electrolyte as a polarization voltage, and a step of terminating the pulse charge when the polarization voltage increases to or above a predetermined threshold value. According to the present invention, it is possible to quickly charge the non-aqueous electrolyte secondary battery including the heat-resistant layer between the negative electrode and the positive electrode at such a borderline level as not to cause overcharge.

5 Claims, 10 Drawing Sheets

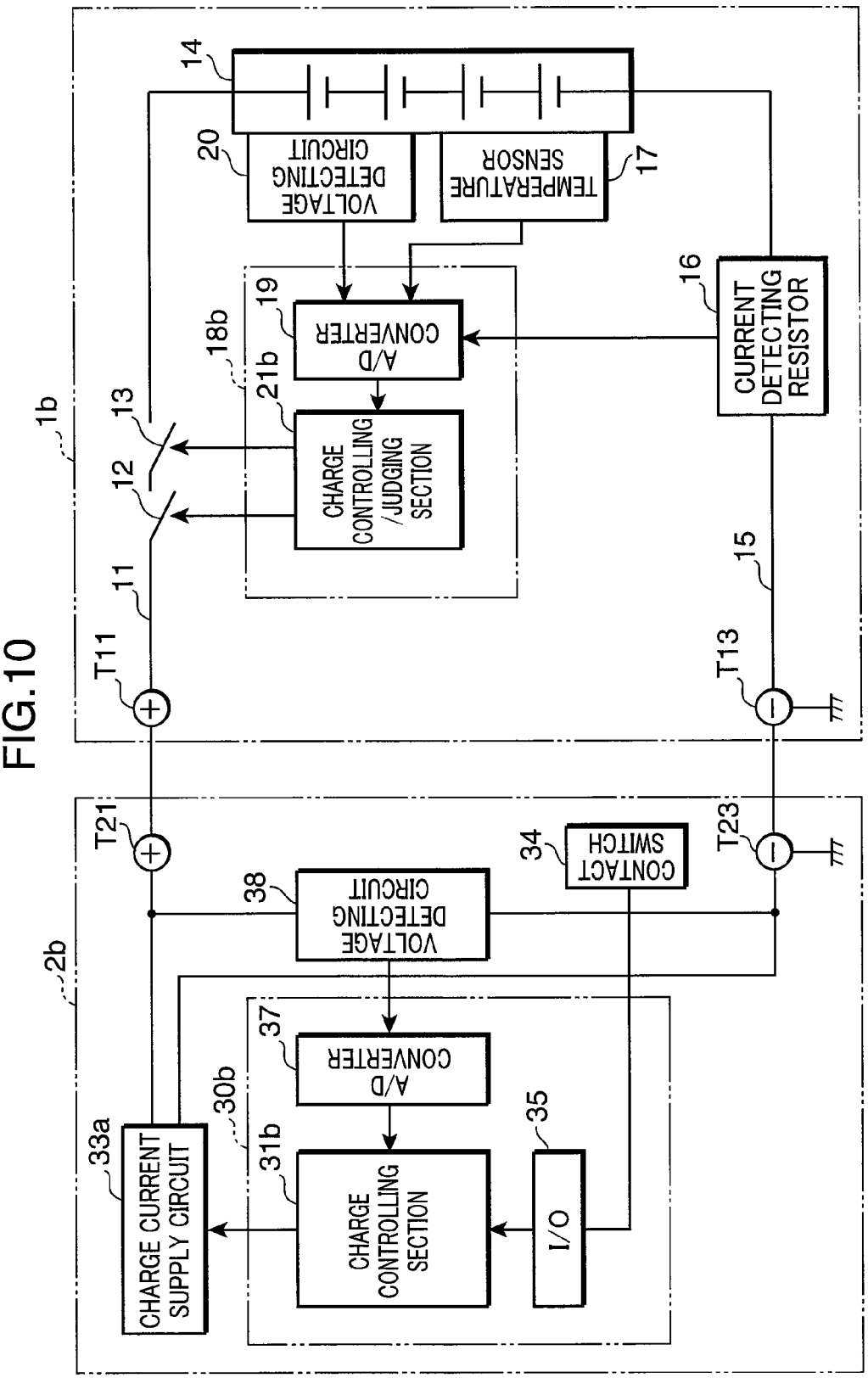

NON-AQUEOUS ELECTROLYTE SECONDARY BATTERY CHARGING METHOD, ELECTRONIC DEVICE, BATTERY PACK, AND CHARGING DEVICE

RELATED APPLICATIONS

This application is the U.S. National Phase under 35 U.S.C. §371 of International Application No. PCT/JP2007/073865, filed on Dec. 11, 2007, which in turn claims the benefit of Japanese Application No. 2006-349461, filed on Dec. 26, 2006, the disclosures of which Applications are incorporated by reference herein.

FIELD OF TECHNOLOGY

The present invention relates to a non-aqueous electrolyte secondary battery charging method, an electronic device, a battery pack and a charging device.

BACKGROUND TECHNOLOGY

A non-aqueous electrolyte secondary battery including a porous protection film arranged between a negative electrode and a positive electrode and containing resin binders and inorganic oxide fillers is disclosed, for example, in patent literature 1. According to such a structure, the occurrence of an internal short circuit is suppressed even if an active material peeled off from the electrode or swarf in a cutting process attaches to the electrode surface at the time of manufacturing.

It is known as a deterioration mechanism of a non-aqueous electrolyte secondary battery that a positive electrode active material of the secondary battery is eluted and precipitates on the negative electrode to form an insulting coating in the case of overcharge. It is also known as another deterioration mechanism that, when a non-aqueous electrolyte secondary battery is overcharged, concentration polarization in which the concentration of lithium ions dissolved in an electrolyte becomes lower at a positive electrode side while becoming higher at a negative electrode side occurs and lithium, which can no longer enter the negative electrode, precipitates on a negative electrode surface in the form of metallic lithium.

Patent Literature 1:
Publication of Japanese Patent No. 3371301

DISCLOSURE OF THE INVENTION

An object of the present invention is to provide a charging method capable of reducing the deterioration of a non-aqueous electrolyte secondary battery, an electronic device, a battery pack and a charging device.

A non-aqueous electrolyte secondary battery charging method according to one aspect of the present invention comprises a pulse charging step of performing pulse charge by applying a pulse to a secondary battery including a heat-resistant layer between a negative electrode and a positive electrode; a polarization detecting step of detecting a change amount of a cell voltage associated with a change in the concentration polarization of a non-aqueous electrolyte as a polarization voltage after the cell voltage is changed due to a voltage drop caused by an internal resistance of the secondary battery when a charge current flowing in the secondary battery changes due to a change in an applied state of the pulse; and a deterioration detecting step of terminating the pulse charge if the polarization voltage detected in the polarization detecting step increases to or above a predetermined first threshold value.

An electronic device according to one aspect of the present invention comprises a battery pack including a secondary battery having a heat-resistant layer between a positive electrode and a negative electrode; a charging device including a charge current supplying section and a charge controlling section for charging the secondary battery; and a load device to be driven by the secondary battery, wherein the battery pack includes a voltage detecting section for detecting a cell voltage of the secondary battery and a transmitting section for transmitting a detection result of the voltage detecting section to the charging device; the charging device includes a receiving section for receiving the cell voltage from the transmitting section; and the charge controlling section includes a pulse charging section for performing pulse charge by applying a pulse to the secondary battery by means of the charge current supplying section, a polarization detecting section for causing the receiving section to receive the cell voltage detected by the voltage detecting section and detecting a change amount of the cell voltage received by the receiving section associated with a change in concentration polarization of a non-aqueous electrolyte as a polarization voltage after the cell voltage received by the receiving section is changed due to a voltage drop caused by an internal resistance of the secondary battery when a charge current flowing in the secondary battery changes as an applied state of the pulse changes, and a deterioration detecting section for terminating the pulse charge by the pulse charging section if the polarization voltage detected by the polarization detecting section increases to or above a predetermined first threshold value.

A battery pack according to one aspect of the present invention comprises a non-aqueous electrolyte secondary battery including a heat-resistant layer between a positive electrode and a negative electrode; a voltage detecting section for detecting a cell voltage of the secondary battery; a switching element for switching a charge current from an externally connected charging device, thereby applying a pulse to the secondary battery to perform pulse charge; a polarization detecting section for detecting a change amount of the cell voltage associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes; and a deterioration detecting section for stopping the switching of the switching element to terminate the pulse charge if the polarization voltage detected by the polarization detecting section increases to or above a predetermined first threshold value.

A charging device according to one aspect of the present invention comprises a charge current supplying section for charging a battery pack including a non-aqueous electrolyte secondary battery having a heat-resistant layer between a negative electrode and a positive electrode; a charge controlling section for controlling the charge current supplying section; and a voltage detecting section for detecting a terminal voltage of the battery pack, the charge controlling section including a pulse charging section for performing pulse charge by applying a pulse to the secondary battery by means of the charge current supplying section, a polarization detecting section for detecting a voltage change amount associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes, and a deterioration detecting section for terminating the pulse charge by the pulse charging section if the polarization voltage detected by the polarization detecting section increases to or above a predetermined first threshold value.

According to these charging method, electronic device, battery pack and charging device, the non-aqueous electrolyte secondary battery including the heat-resistant layer between the negative electrode and the positive electrode is used. The inventor of the present application found out that deterioration of the secondary battery caused by the formation of an insulating coating through the precipitation of a positive electrode active material on the negative electrode could be reduced since the movement of the positive electrode active material eluted from the positive electrode to the negative electrode is hindered by the heat-resistant layer by providing the heat-resistant layer between the negative electrode and the positive electrode of the non-aqueous electrolyte secondary battery.

Thus, even in the case of quickly charging the non-aqueous electrolyte secondary battery with a high current of, e.g. 10 C (1 C is a current value at which a remaining amount of a secondary battery is 0 when the rating capacity of the secondary battery is discharged at a constant current for 1 hour), the movement of the positive electrode active material to the negative electrode associated with quick charge is hindered by the heat-resistant layer. Therefore, it becomes easy to shorten a charging time by increasing a charge current while the deterioration of the non-aqueous electrolyte secondary battery is suppressed.

As for deterioration caused by the precipitation of lithium ions, which cannot enter the negative electrode, on the surface of the negative electrode at a negative electrode side where concentration is increased by concentration polarization, it is possible to suppress the precipitation of the positive electrode active material on the negative electrode and reduce the deterioration of the secondary battery by monitoring a degree of such concentration polarization and terminating the charge before the precipitation of the positive electrode material on the negative electrode progresses when a certain degree or more of the concentration polarization is detected.

Since the concentration polarization itself cannot be directly detected, the change amount of the cell voltage associated with the change of the concentration polarization is detected as the polarization voltage and a degree of the concentration polarization is indirectly judged using the polarization voltage. Accordingly, pulse charge is performed and the degree of the concentration polarization is judged from the change of the cell voltage at the time of starting or completing pulse application, i.e. from the change of the cell voltage when the applied state of the pulse changes.

Specifically, after the cell voltage suddenly increases up to a voltage determined by a charge current and an internal resistance upon the application of a charge pulse to the secondary battery, the cell voltage is maintained at this voltage if there is no concentration polarization. However, if the concentration polarization progresses, the concentration of the electrolyte at the negative electrode side increases due to lithium ions having migrated to the negative electrode side, and the resistance value of the electrolyte increases to increase the cell voltage.

On the other hand, at the time of completing the application of the charge pulse to the secondary battery, after the cell voltage suddenly decreases by a voltage equivalent to a voltage drop when the charge current flows through the internal resistance, the cell voltage is maintained at this voltage if the concentration polarization was initially absent. However, if the concentration polarization was present, lithium ions having migrated to the negative electrode side are diffused to decrease the concentration of the electrolyte at the negative electrode side and the resistance value of the electrolyte decreases to reduce the cell voltage as the concentration polarization is eliminated. Accordingly, the change amount of the cell voltage associated with the change of the concentration polarization such as the progress, elimination or the like of the concentration polarization is detected as the polarization voltage, and the pulse charge is terminated when the polarization voltage increases to or above the predetermined first threshold value.

Thus, the deterioration of the secondary battery caused by the precipitation of the positive electrode active material on the negative electrode by the concentration polarization can be reduced. Further, even if the concentration polarization occurs upon quickly charging the non-aqueous electrolyte secondary battery with a high current, the charge is terminated before the concentration polarization progresses to a certain degree or more. Therefore, a possibility of the precipitation of the positive electrode active material on the negative electrode is reduced, with the result that it becomes easy to quickly charge the non-aqueous electrolyte secondary battery at such a borderline level as not to cause overcharge.

BRIEF DESCRIPTION OF THE DRAWINGS

FIG. 10 is a block diagram showing an electrical construction of an electronic device according to a fifth embodiment of the invention.

BEST MODES FOR EMBODYING THE INVENTION

[First Embodiment]

Figure 1:
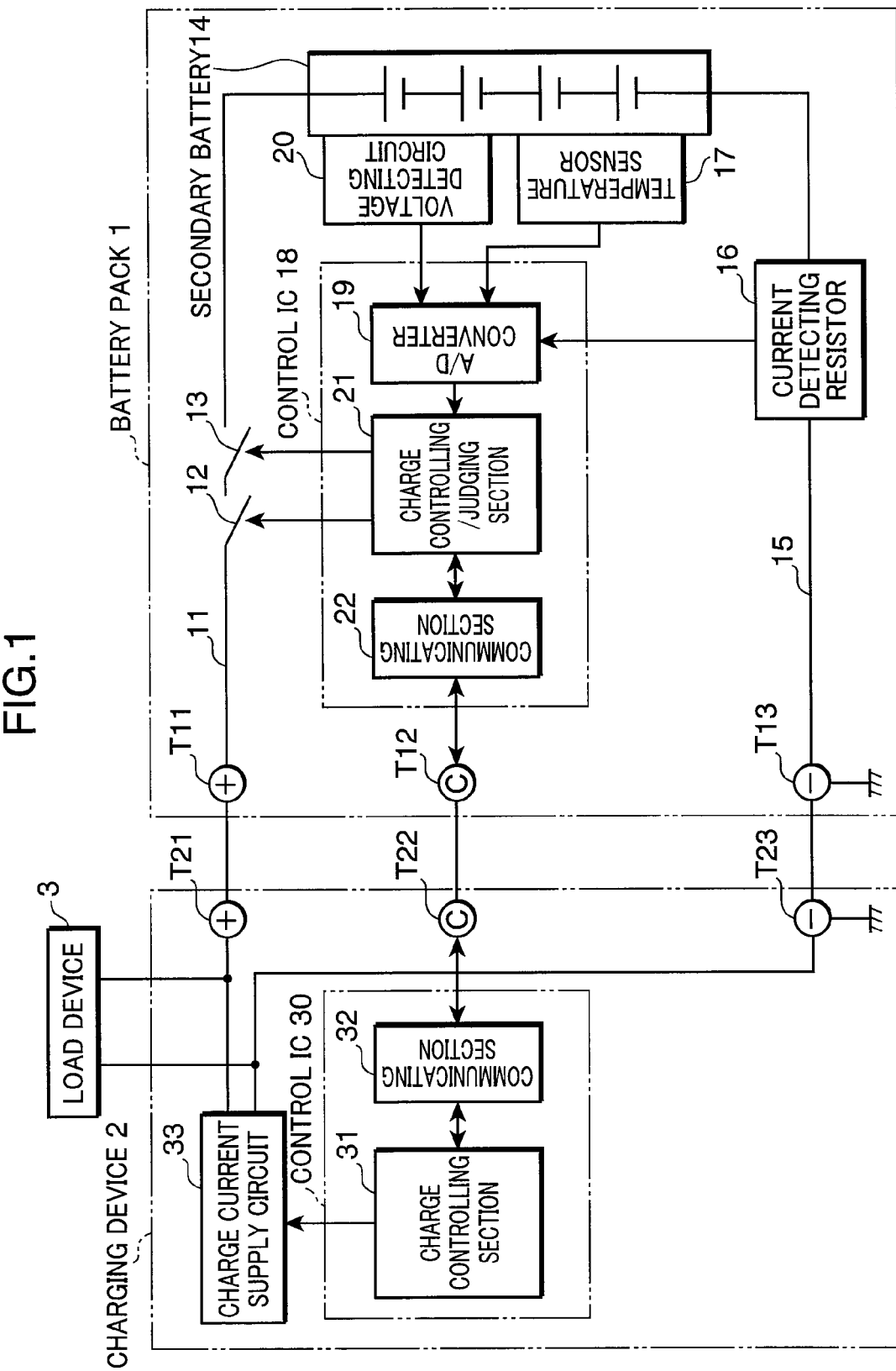
FIG. 1 is a block diagram showing an electrical construction of an electronic device according to a first embodiment of the invention, FIG. 2 are diagrams showing a deterioration mechanism caused by concentration polarization of a non-aqueous electrolyte.

FIG. 1 is a block diagram showing an electrical construction of an electronic device according to a first embodiment of the present invention. This electronic device is provided with a battery pack 1, a charging device 2 for charging the battery pack 1 and a load device 3. Although the battery pack 1 is charged by the charging device 2 in FIG. 1, it may be installed in the load device 3 and charged via the load device 3. The battery pack 1 and the charging device 2 are connected with each other via DC high side terminals T11, T21 for power feeding, communication signal terminals T12, T22 and GND terminals T13, T23 for power feeding and communication signals. In the case of charging via the load device 3, similar terminals are provided.

In the battery pack 1, FETs 12, 13 with different conductive types for charge and for discharge are provided in a DC high side charge/discharge path 11 extending from the terminal T11. This charge/discharge path 11 is connected with a high side terminal of a secondary battery 14. A low side terminal of the secondary battery 14 is connected with the GND terminal T13 via a DC low side charge/discharge path 15. A current detecting resistor 16 for converting a charge current and a discharge current into voltage values is provided in this charge/discharge path 15.

The secondary battery 14 is such that one or more cells are connected in series parallel (four cells arranged with one in each stage are connected in series in an example of FIG. 1). The temperatures of the cells are detected by a temperature sensor 17 (temperature detecting section) and inputted to an analog-to-digital converter 19 in a control IC 18. Inter-terminal voltages of the respective cells are detected by a voltage detecting circuit 20 (voltage detecting section) and inputted to the analog-to-digital converter 19 in the control IC 18. A current value detected by the current detecting resistor 16 is also inputted to the analog-to-digital converter 19 in the control IC 18. The analog-to-digital converter 19 converts the respective input values into digital values and outputs them to a charge controlling/judging section 21.

The charge controlling/judging section 21 includes a microcomputer, its peripheral circuits and the like. The charge controlling/judging section 21 computes an SOC (state of charge) in response to the respective input values from the analog-to-digital converter 19 and transmits the voltages, temperatures and presence or absence of abnormality of the respective cells from a communicating section 22 (transmitting section) to the charging device 22 via the terminals T12, T22; T13, T23. The charge controlling/judging section 21 turns the FETS 12, 13 on to enable charge or discharge when charge or discharge is normally carried out while turning the FETs 12, 13 off to prohibit charge or discharge when abnormality is detected.

In the charging device 2, the cell voltages (terminal voltages of the cells), the temperatures and the presence or absence of abnormality transmitted from the communicating section 22 are received by a communicating section 32 (receiving section) of a control IC 30. A charge controlling section 31 controls a charge current supply circuit 33 to supply a charge current to the battery pack 1. The charge current supply circuit 33 includes an AC-to-DC converter, a DC-to-DC converter and the like, coverts an input voltage into a voltage value, a current value and a pulse width determined beforehand and supplies them to the charge/discharge paths 11, 15 via the terminals T21, T11; T23, T13.

The charge controlling section 31 is constructed, for example, by using a microcomputer. The charge controlling section 31 functions as a pulse charging section, a polarization detecting section, a deterioration detecting section and a pulse changing section by implementing a specified control program.

In the electronic device constructed as described above, each of the secondary battery 14 is a non-aqueous electrolyte secondary battery including a heat-resistant layer arranged between a negative electrode and a positive electrode and made of a porous projection film containing resin binders and inorganic oxide fillers. The inorganic oxide fillers are selected from alumina powder or $SiO_2$ powder (silica) whose particle diameter lies in the range of 0.1 µm to 50 µm. Further, the thickness of the porous protection film is set to 0.1 µm to 200 µm. The porous protection film is formed by applying fine-particle slurry containing resin binders and inorganic oxide fillers to at least one of the surfaces of the negative electrode and the positive electrode.

Here, in the case of a normal lithium ion secondary battery including no heat-resistant layer made of such a porous protection film, lithium can no longer enter a negative electrode to cause deterioration if the secondary battery is overcharged such that the SOC exceeds 120%. Even with the SOC equal to or below 100%, if charging is performed at an excessively high voltage and a positive electrode is exposed to high voltage, metal is eluted from a positive electrode active material and precipitates on the negative electrode to form such an insulating coating copolymerized with components of an electrolyte and components of an interface of the negative electrode and this coating is a highly resistant coating and causes deterioration.

In contrast, in the case of a non-aqueous electrolyte secondary battery including a heat-resistant layer made of the above porous protection film, it was found out by an experiment of the inventor of the present application that not only the occurrence of the above internal short circuit can be suppressed, but also there is high resistance to overcharge and unprecedented quick charging is possible. In other words, in the non-aqueous electrolyte secondary battery, deterioration by overcharge is caused by a mechanism in which the positive electrode active material is eluted and precipitates on the negative electrode to form the insulating coating. The inventor of the present application and his colleagues found out that the eluted positive electrode active material is blocked by the porous protection film to suppress the deterioration of the non-aqueous electrolyte secondary battery by employing the above structure.

In the case of the non-aqueous electrolyte secondary battery including the heat-resistant layer made of such a porous protection film, even if charge is performed, for example, at 4.5 V which is a voltage exceeding 4.2 V and 4.25 V as standard charge voltages or even if charge is performed at a current value of, for example, 10 C or 20 C, which is a current value exceeding 1 C as a standard charge current of lithium ion secondary batteries (1 C is a current value at which a remaining amount is 0 when the rating capacity of a secondary battery is discharged at a constant current for 1 hour), metal precipitation on the negative electrode and the formation of the insulating coating can be blocked and suppressed.

Accordingly, in this embodiment, upon quickly charging the non-aqueous electrolyte secondary battery 14 including such a heat-resistant layer at such a borderline level as not to cause overcharge, what should be noted is that the charge controlling/judging section 31 of the charging device 2 causes the charge current supply circuit 30 to perform pulse charge by cyclically outputting a current pulse (charge pulse) of, for example, a high current of 50 A which is 20 C for a rating capacity of 2.5 Ah. At this time, since the terminal voltage of the non-aqueous electrolyte secondary battery 14 is permitted to be a high voltage of, e.g. 4.5 V per cell (since the secondary battery 14 is comprised of the four cells connected in series in the example of FIG. 1, the charging device 2 outputs 18 V).

The charge controlling/judging section 31 receives the respective cell voltages read by the voltage detecting circuit 20 by means of the communicating sections 22, 32 and stops the charge at such a level as not to cause overcharge.

This is because, upon charging with high voltage/high current as described above, deterioration caused by metal precipitation and formation of the insulating coating is suppressed in the non-aqueous electrolyte secondary battery 14 including the above heat-resistant layer and, hence, it is sufficient to monitor only deterioration caused by concentration polarization of the non-aqueous electrolyte. The charge controlling/judging section 31 judges a deterioration level by the concentration polarization from the respective cell voltages detected by the voltage detecting circuit 20 and terminates the supply of a charge current before the deterioration reaches a specified level.

Figure 2A:
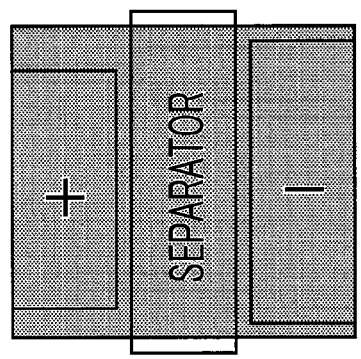
Figure 2B:
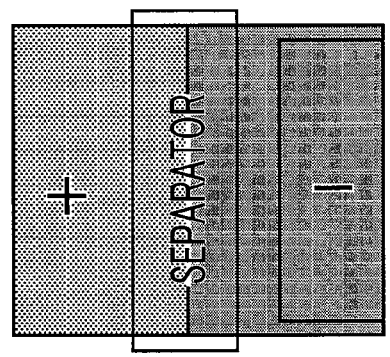
Figure 2C:
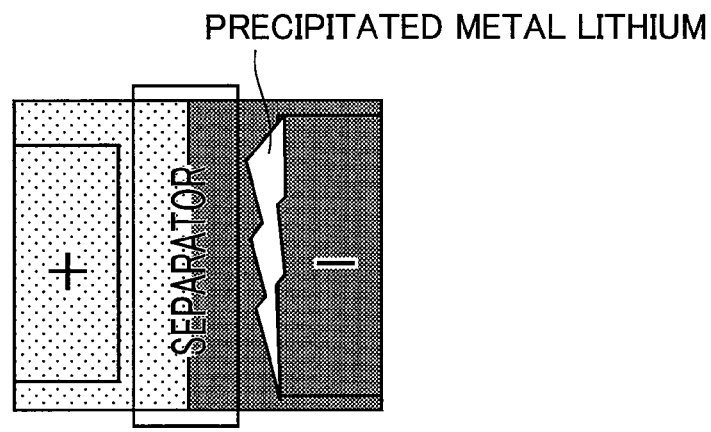

FIGS. 2A, 2B and 2C are diagrams showing the deterioration mechanism caused by the concentration polarization. In a state before charging, the concentration of lithium ions eluted in an electrolyte is uniform as shown in FIG. 2A. If quick charge is performed with at least one of high voltage and high current as described above with this uniform concentration set as an optimal concentration when a secondary battery is new, lithium ions quickly migrate from a positive electrode side (+) toward a negative electrode side (−). Then, the concentration of lithium ions becomes lower at the positive electrode side (+) and becomes higher at the negative electrode side (−) as shown in FIG. 2B. When quick charge is further continued, metal lithium, which can no longer enter the negative electrode at the negative electrode side (−) where the concentration of lithium ions increased, precipitates on the surface as shown in FIG. 2C.

Figure 3:
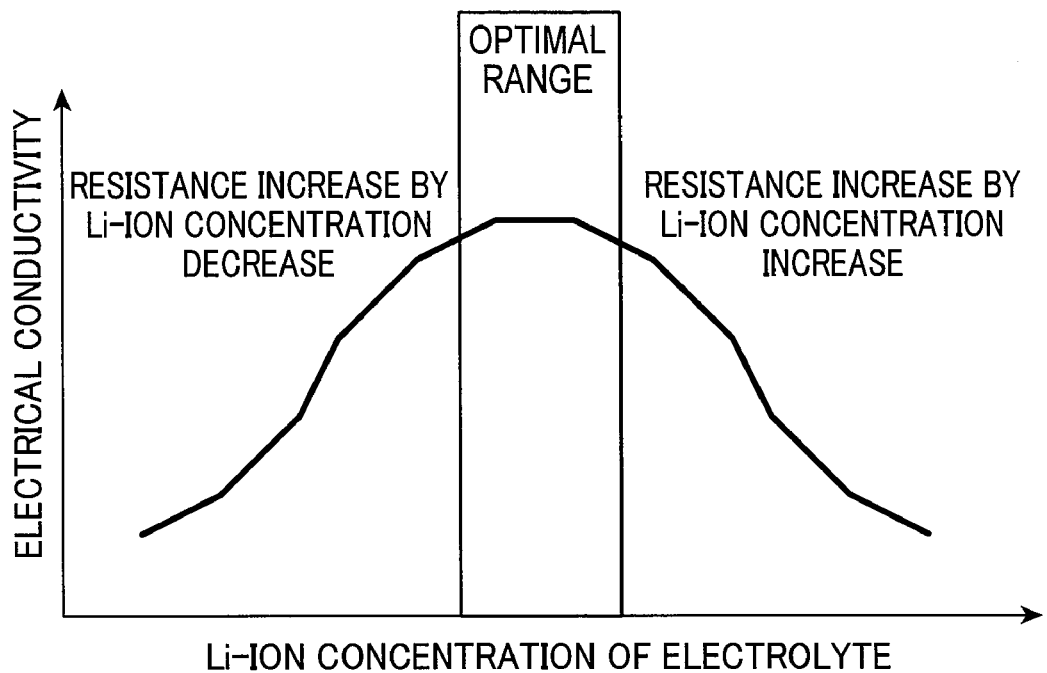
FIG. 3 is a graph showing a relationship between the lithium ion concentration and electrical conductivity of the non-aqueous electrolyte.

On the other hand, the electrical conductivity of the electrolyte is highest when lithium ion concentration is proper as shown in FIG. 3. The electrical conductivity of the electrolyte decreases if the lithium ion concentration becomes higher or lower than the proper concentration. In other words, the resistance of the electrolyte increases if the lithium ion concentration becomes higher or lower. Thus, if concentration polarization progresses, charging capacity decreases even if the same charge voltage is applied and deterioration progresses.

Figure 4:
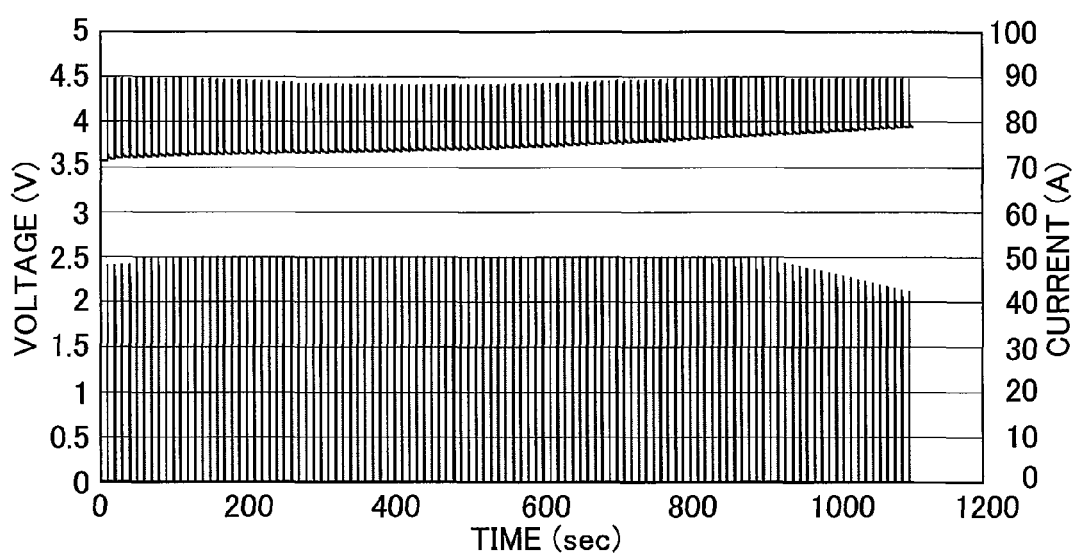
FIG. 4 is a waveform chart showing an experimental result by the inventor of the present application, FIG. 5 are graphs enlargedly showing a voltage waveform of one pulse of a pulse waveform shown in FIG. 4.

FIG. 4 is an example of a waveform chart showing an experimental result by the inventor of the present application. FIG. 4 shows changes in the cell voltage and the charge current in the case of performing pulse charge with a high voltage of 4.5 V and a high current of 50 A per cell until the SOC reaches 80% from 20%, wherein the cycle of the pulse (charge pulse) is 10 sec and the duty thereof is 10%.

Figure 5A:
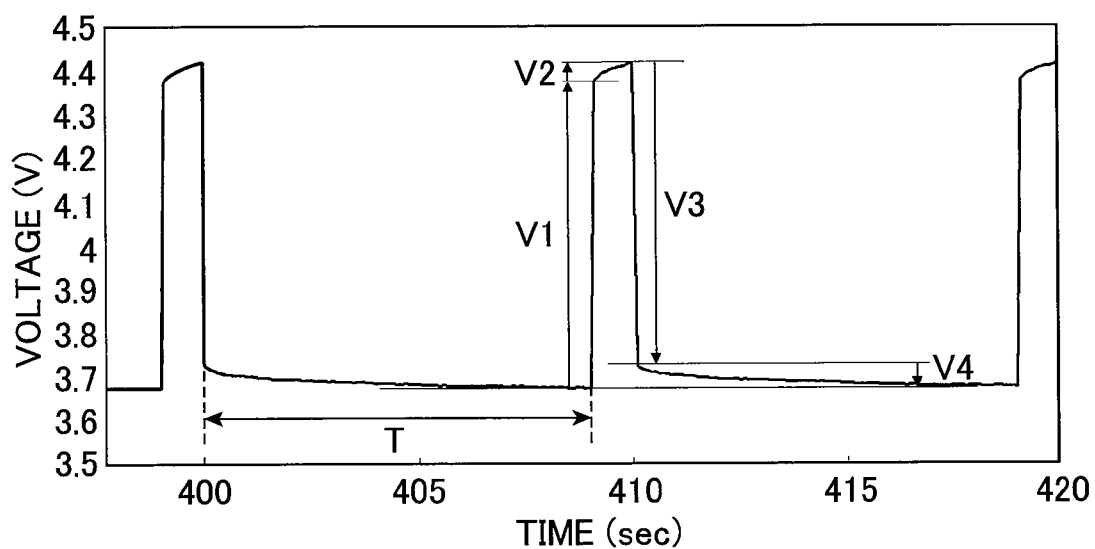

FIG. 5A is a graph enlargedly showing a voltage waveform of the pulse shown in FIG. 4. As shown in FIG. 5A, if a pulse voltage of 4.5 V is applied to the cell having, for example, a terminal voltage (cell voltage) of 3.7 V, the cell voltage first suddenly increases by a voltage V1 corresponding to a voltage drop caused by the internal resistance of the cell produced by the flow of the charge current in the cell. Thereafter, this voltage V1, e.g. 4.35 V is maintained if there is no concentration polarization or the SOC is small.

On the other hand, as the SOC increases to a certain degree and the concentration polarization progresses, the concentration of the electrolyte at the negative electrode side increases by lithium ions having migrated to the negative electrode side and the resistance of the electrolyte, i.e. the inner resistance of the cell increases. According to an increase in the resistance value of the electrolyte associated with the progress of the concentration polarization, the cell voltage moderately increases by a voltage V2 (polarization voltage) as shown in FIG. 5A.

In contrast, at the time of completing pulse application (at a falling edge timing of the pulse), the charge current flowing in the cell becomes substantially zero, whereby the cell voltage suddenly drops by a voltage V3 corresponding to a voltage drop caused by the internal resistance of the cell. The voltage reached upon a sudden drop by the voltage V3, i.e. 3.7 V as the cell voltage in the above initial state is maintained as the cell voltage if there is no concentration polarization or the SOC is small at the time of starting pulse application.

On the other hand, if the SOC is large to a certain degree and there is concentration polarization, after the sudden drop by the voltage V3, lithium ions having migrated to the negative electrode side are diffused to reduce the concentration of the electrolyte at the negative electrode side and moderately decrease the resistance of the electrolyte as the concentration polarization is eliminated. According to a decrease in the resistance value of the electrolyte associated with this elimination of the concentration polarization, the cell voltage moderately decreases by a voltage V4 (polarization voltage). Accordingly, in this embodiment, a degree of change of the cell voltage associated with the concentration polarization is determined as described below and the charge is terminated when the change of the cell voltage increases to or above a specified threshold value.

Although the above voltage V2 may be used as a polarization voltage, the voltage V2 includes an increase of an OCV (open circuit voltage) caused by the charge of each cell since being detected in a state where the charge pulse is applied. Thus, an error occurs. On the other hand, at the time of completing pulse application, hardly any currents flow in the charge/discharge paths 11, 15. Therefore, the voltage detected by the voltage detecting circuit 20 does not include a change of the OCV caused by the charge or discharge of each cell.

Accordingly, by obtaining the voltage V4 as a difference between the cell voltage detected by the voltage detecting circuit 20 and the cell voltage reached upon entering a steady state as a result of a gradual drop as the polarization voltage at the time of completing pulse application, accuracy in detecting the polarization voltage can be more improved than in the case where the voltage V2 is obtained as the polarization voltage.

However, if the pulse cycle is short or the duty is large, the next pulse is applied before the cell voltage reaches the steady state because of the polarization is eliminated, whereby the cell voltage increases. Thus, the voltage V4 cannot be precisely detected. Accordingly, the charge controlling section 31 may calculate a polarization voltage Vc produced with the concentration polarization by correcting the voltage V2 detected when the pulse rises based on an accumulated amount of polarization. A degree of concentration polarization is judged based on the thus obtained polarization voltage Vc to terminate the charge (pulse application).

If the concentration polarization produced by the one previous charge pulse is not completely eliminated at a timing immediately before the rise of the charge pulse, an accumulated polarization voltage Vca produced by the concentration polarization remaining without being eliminated is included in the voltage V1. Then, the voltage V2 has a voltage value smaller than the original polarization voltage Vc by the accumulated polarization voltage Vca.

Figure 5B:
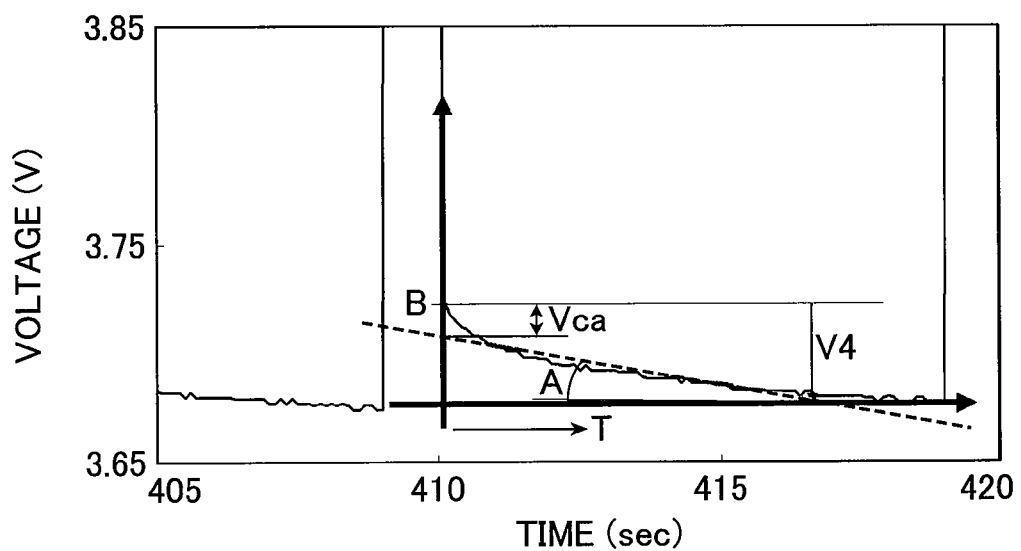

Accordingly, the charge controlling section 31 calculates the accumulated polarization voltage Vca in accordance with the following equation (1). An enlarged cell voltage waveform at the fall of the pulse is shown in FIG. 5B.

$$Vca = B - A \cdot T \quad (1)$$

In equation (1), a polarization relaxation coefficient A is an inclination of a regression line obtained from a voltage curve of the cell voltage gradually decreasing after suddenly decreasing at the time of completing pulse application (at the fall). A concentration polarization voltage B (first cell voltage) is a cell voltage at the time of completing pulse application (at a falling timing of the pulse). Time T is a period from an application completing (falling) timing of the one previous pulse to an application starting (rising) timing of the pulse this time.

If the time T1 is longer than a period from the completion of the pulse application (fall) to the elimination of the concentration polarization, the accumulated polarization voltage Vca becomes negative (Vca<0) in equation (1), wherefore the accumulated polarization voltage Vca is assumed to be zero (0).

Since the polarization relaxation coefficient A depends on temperature, the value of the polarization relaxation coefficient A corresponding to the cell temperature detected by the temperature sensor 17 is set by referring to a table or the like. Further, as the time T becomes longer, the concentration polarization is eliminated and the accumulated polarization voltage Vca decreases. The polarization relaxation coefficient A decreases as temperature increases.

The charge controlling section 31 calculates an actual polarization voltage Vc from the voltage V2 (voltage α) and the accumulated polarization voltage Vca in accordance with the following equation (2).

$$Vc = V2 + Vca \quad (2)$$

Further, the charge controlling section 31 judges the start of deterioration caused by polarization and terminates the charge if the polarization voltage Vc increases to or above a predetermined threshold value. This threshold value is, for example, set to 0.1 V per cell.

Upon detecting such a polarization voltage Vc, the respective cell voltages may be sampled, for example, in a cycle of 100 msec by the analog-to-digital converter 19 and the voltage detecting circuit 20 and voltage detecting accuracy may be about 10 mV.

TABLE-1 shows measurement results of the polarization voltage Vc and a cycle retention rate by changing the pulse cycle and duty of the charging pattern shown in FIG. 4. The cycle retention rate in this case is a ratio of retained capacity after repeating 300 cycles of charge in each charging pattern and discharge at a constant current 1 C (2.5 A) with an initial capacity set to 100%.

cycle retention rate, deterioration caused by polarization starts when the polarization voltage Vc is equal to or above 0.1 V per cell.

From these experimental results, with a capacity of 2.5 Ah per cell, a maximum value of the charge voltage is set to 4.5 V, a maximum value of the charge current to 50 A, a maximum value of the pulse width to 1 sec, a minimum value of the cycle to 3 sec, a maximum value of the duty to 33% and a threshold value of the polarization voltage Vc to 0.1 V per cell in this embodiment.

Figure 6:
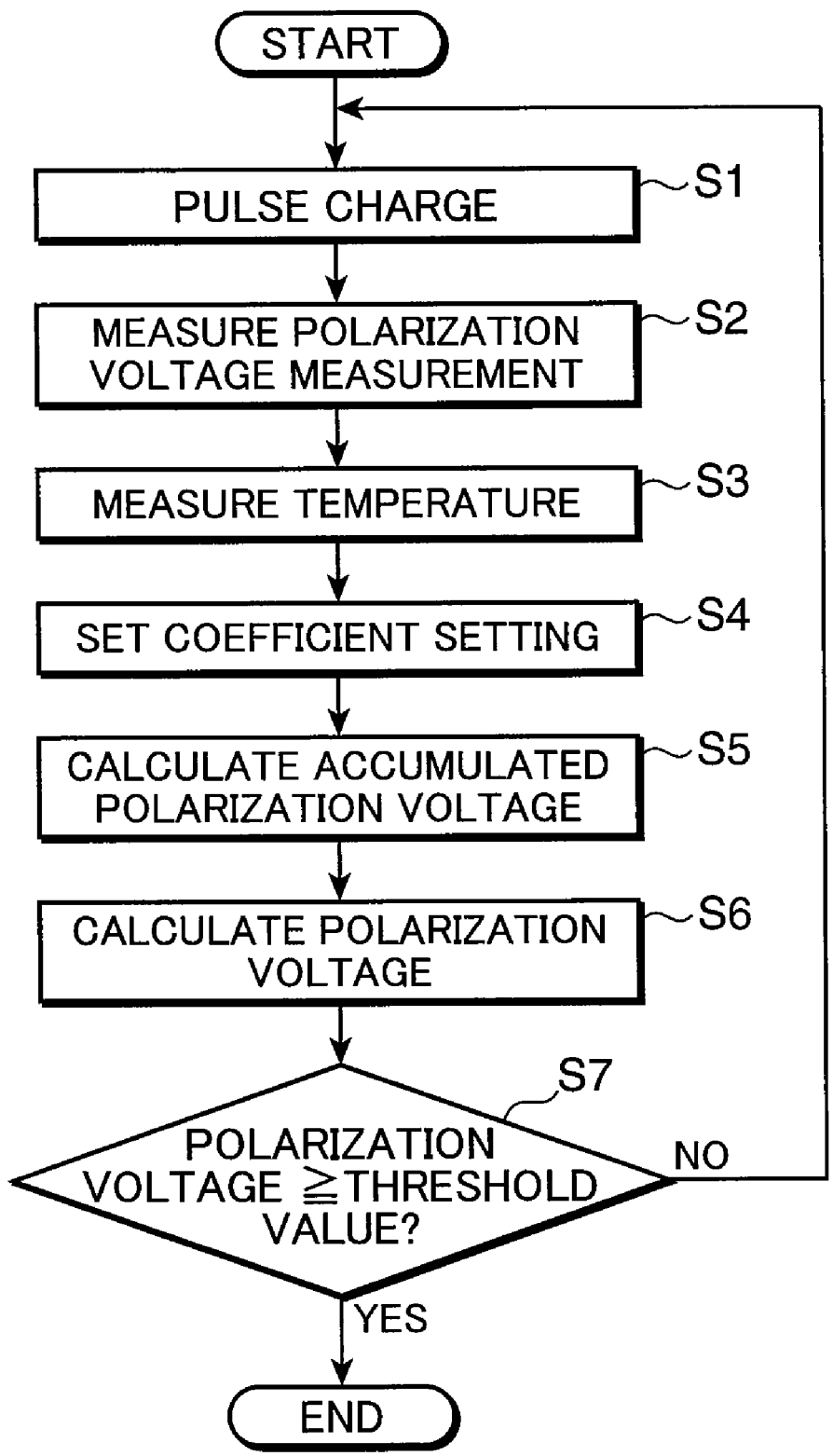
FIG. 6 is a flow chart showing a charging operation according to the first embodiment of the invention.

FIG. 6 is a flow chart showing the operation of the electronic device constructed as described. The charge controlling section 31 starts a charging operation upon detecting the connection of the battery pack 1 via the communicating sections 32, 22. In other words, the charge controlling section 31 causes the charge current supply circuit 33 to perform pulse charge by supplying a current pulse having a current value of 50 A to the secondary battery 14 in a cycle of 3 sec and at a duty of 33%, for example, determined beforehand in a range where a maximum value of a pulse voltage is 4.5 V in Step S1.

In Step S2, the charge controlling section 31 measures the voltage V2 produced by the progress of the above concentration polarization at the time of starting pulse application (pulse rising timing) and the concentration polarization voltage B at the time of completing pulse application (pulse falling timing). In Step S3, the cell temperature is measured by the temperature sensor 17. In Step S4, the polarization relaxation coefficient A corresponding to the cell temperature is set by the charge controlling section 31.

Based on this, the charge controlling section 31 calculates the accumulated polarization voltage Vca from equation (1) in Step S5 and calculates an actual polarization voltage Vc from equation (2) in Step S6 since the time T is already known from the pulse cycle and the pulse duration. In Step S7, the charge controlling section 31 judges whether or not the calculated actual polarization voltage Vc is equal to or higher than a predetermined threshold value, e.g. 0.1 V and terminates the pulse charge by the charge current supply circuit 33

TABLE 1

| PULSE ON TIME sec | PULSE OFF TIME sec | PULSE CYCLE sec | PULSE ON DUTY % | POLARIZATION VOLTAGE Vc V | CYCLE RETENTION RATE % |
|---|---|---|---|---|---|
| 1 | 9 | 10 | 10 | 0.06 | 97 |
| 0.1 | 0.9 | 1 | 10 | 0.03 | 98 |
| 3 | 27 | 30 | 10 | 0.11 | 82 |
| 5 | 45 | 50 | 10 | 0.13 | 65 |
| 10 | 90 | 100 | 10 | 0.19 | 50 |
| 1 | 5 | 6 | 17 | 0.07 | 97 |
| 1 | 3 | 4 | 25 | 0.08 | 97 |
| 1 | 2 | 3 | 33 | 0.09 | 96 |
| 1 | 1 | 2 | 50 | 0.12 | 76 |

As is clear from TABLE-1, in the case of comparison at the same duty of 10%, the shorter the pulse cycle, the smaller the polarization voltage and the higher the cycle retention rate. Particularly, it is good if the cycle is equal to or shorter than 10 sec (pulse ON time of 1 sec). Accordingly, in the case of changing the duty with the pulse ON time fixed to 1 sec, it is understood that cycle deterioration is large at a duty of 50%, but a charging time can be most shortened with a cycle characteristic satisfactorily maintained at a duty of 33%. In the case of changing the pulse cycle and duty as described above, it is understood that, from the polarization voltage Vc and the if the actual polarization voltage Vc is equal to or higher than the predetermined threshold value.

The charge controlling section 31 continues the pulse charge by the charge current supply circuit 33 by returning to Step 51 if the polarization voltage Vc is below the threshold value. Such an operation may be performed in each pulse or in every several cycles. Further, it may not be necessary to measure the cell temperature and accordingly set the polarization relaxation coefficient A in each pulse, or these measurement and setting may be performed as separate interrupt processings in a longer cycle.

By employing such a construction, when the non-aqueous electrolyte secondary battery 14 including the heat-resistant layer between the negative electrode and the positive electrode is quickly charged at such a borderline level as not to cause overcharge, the charge is performed while a degree of deterioration caused by the concentration polarization is judged. Therefore, quick charge can be performed with a high current while the deterioration of the secondary battery caused by the concentration polarization is suppressed.

Further, upon judging the degree of deterioration caused by the concentration polarization of the non-aqueous electrolyte, the voltage V2 produced when the cell voltage increases due to the application of the pulse voltage includes an OCV (open circuit voltage) change associated with the charge, whereas no OCV change is included when a sharing voltage decreases upon completing the application of the pulse voltage. Accordingly, by correcting the concentration polarization voltage B at this time using the accumulated polarization voltage Vca calculated using the time T from the end of the previous pulse application and the polarization relaxation coefficient A, the actual polarization voltage Vc can be precisely determined.

[Second Embodiment]

Figure 7:
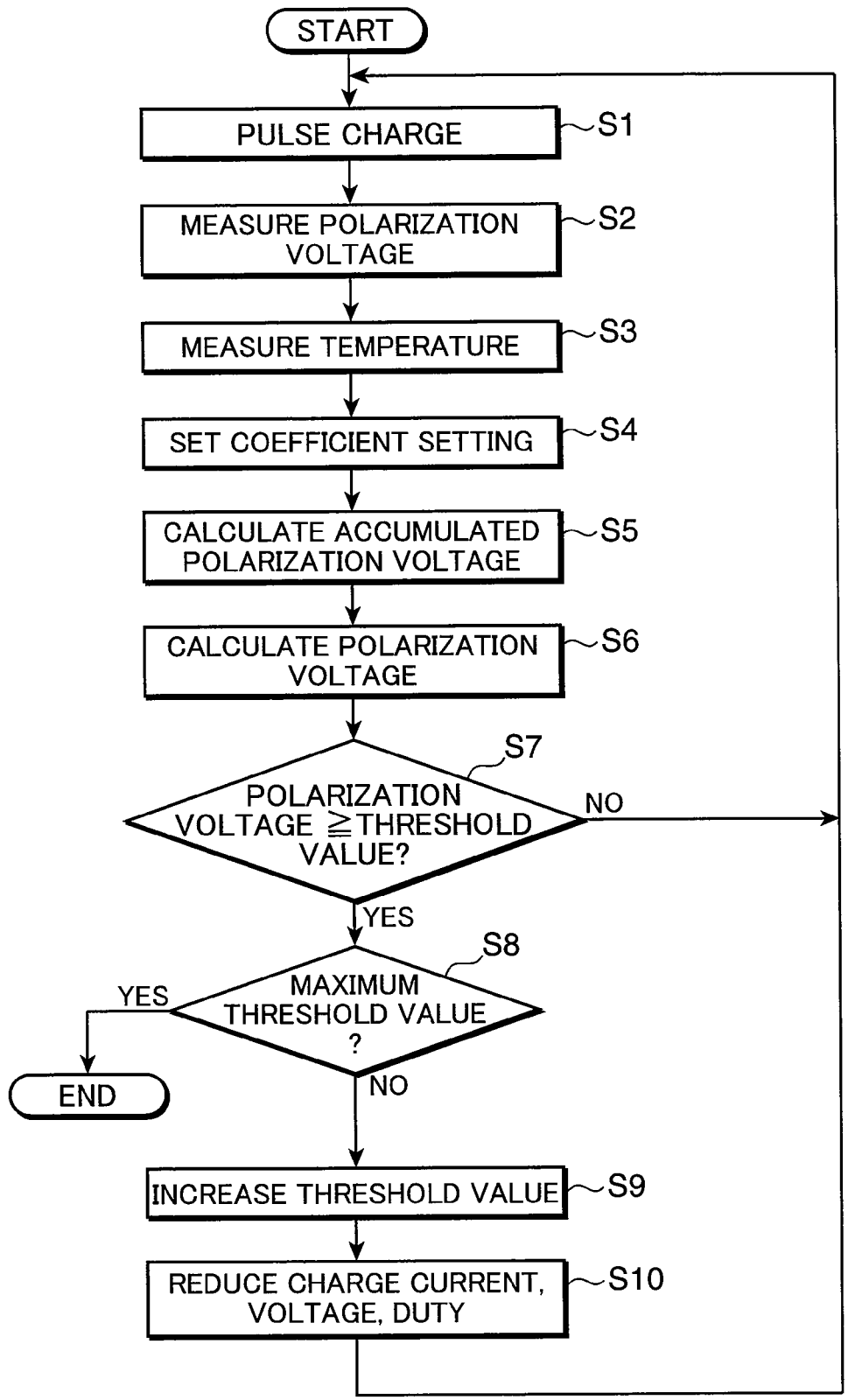
FIG. 7 is a flow chart showing a charging operation according to a second embodiment of the invention.

FIG. 7 is a flow chart showing a charging operation in an electronic device according to a second embodiment of the present invention. The electronic device of this embodiment differs from the above electronic device shown in FIG. 1 in that the charge current supply circuit 33 of the charging device 2 is constructed such that at least one of the charge voltage, the charge current and the duty is variable and a control operation of the charge controlling section 31 of the control IC 30 differs as can be seen in FIGS. 6 and 7, and constructions similar to those of FIG. 1 can be used for the remaining constructions. In FIG. 7, processings similar and corresponding to those of FIG. 6 are identified by the same Step numbers and not described.

What should be noted is that the charge current supply circuit 33 of the charging device 2 is constructed such that at least one of the charge voltage, the charge current and the duty is variable as described above and is reduced as the charging progresses in this embodiment. Specifically, the charge controlling section 31 first starts pulse charge at maximum values of the charge voltage, the charge current and the duty at the beginning of the charging operation in Step S1, first judges whether or not the threshold value is a maximum value in Step S8 if the polarization voltage Vc increases to or above a minimum threshold value, e.g. 0.07 V in Step S7 and sets a second largest threshold value, e.g. 0.08 V in Step S9 unless otherwise. Further, in Step S9, the charge controlling section 31 reduces at least one of the variable parameters of the charge voltage, the charge current and the duty, e.g. reduces the charge current to 40 A and a return is made to Step S1.

In this way, as the charge progresses, it is repeated to update the threshold value and update the variable parameter(s) of the charge voltage, the charge current and the duty. For example, if the polarization voltage Vc is equal to or above a threshold voltage in Step S7 (YES in Step S8) after the threshold value is further increased from 0.09 V up to a maximum value of 0.1 V and the variable parameter, e.g. the charge current is reduced from 30 A to 20 A set as a minimum value beforehand, the charge controlling section 31 terminates the pulse charge.

By employing such a construction, an amount of electric charges injected per unit time decreases after quick charge to a certain level (SOC) while the deterioration of the secondary battery 14 caused by the concentration polarization is suppressed as described above. In this way, the charge can be performed up to a charged state nearer to a fully charged state than that of the first embodiment although a charging time is longer than in the first embodiment (sufficiently shorter as compared with conventional CCCV charge).

[Third Embodiment]

Figure 8:
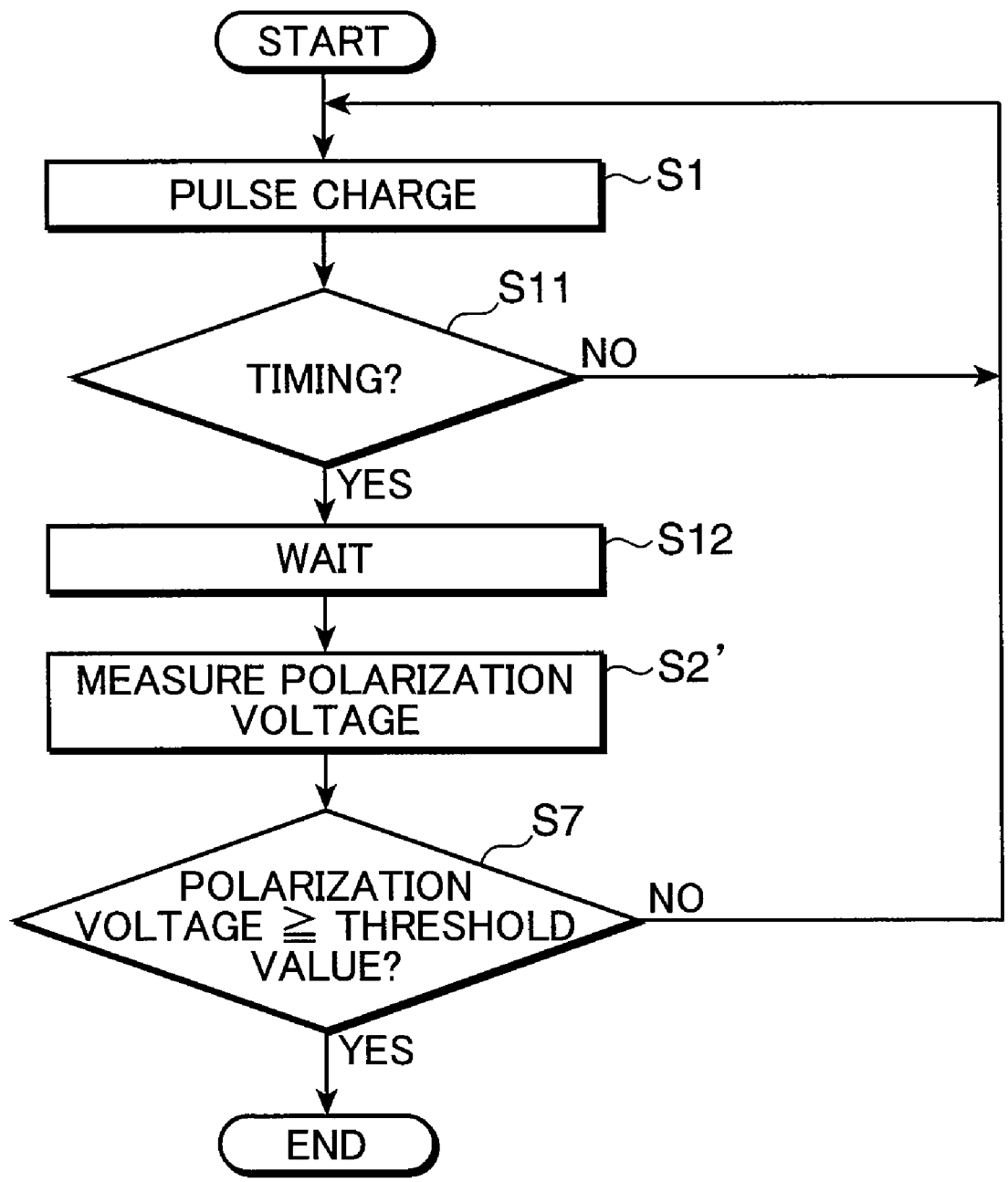
FIG. 8 is a flow chart showing a charging operation according to a third embodiment of the invention.

FIG. 8 is a flow chart showing a charging operation in an electronic device according to a third embodiment of the present invention. The above electronic device constructed as shown in FIG. 1 can be used as the electronic device of this embodiment, and the control operation of the charge controlling section 31 of the control IC 30 only differs as seen in FIGS. 6 and 8. In FIG. 8, processings similar and corresponding to those of FIG. 6 are identified by the same Step numbers and not described.

What should be noted is that the polarization voltage V4 is detected at a specified timing, e.g. a once in every ten pulses timing in Step S11 (YES in Step S11) in this embodiment. Upon the detection of the polarization voltage V4, it is waited on standby in Step S12 for a period equal to or longer than a polarization elimination time set beforehand as time necessary to eliminate the concentration polarization, whereby pulse output is paused for longer than the polarization elimination time. The voltage V4 when the concentration polarization is eliminated is directly measured in Step S2' after the passage of sufficient time from the previous pulse output and the passage of at least the polarization elimination time from the end of the pulse application (fall of the pulse). The polarization elimination time can be, for example, empirically obtained.

The measurement of the voltage V4 is not limited to the one made after the passage of the polarization elimination time from the end of the pulse application as in the above example. For example, the cell voltage may be monitored after the end of the pulse application and the voltage V4 may be measured when the cell voltage enters a steady state (cell voltage does not change any longer), whereby the voltage V4 when the concentration polarization is eliminated and the cell voltage enters the steady state may be measured.

Thereafter, the operation is completed if this polarization voltage V4 increases to or above the threshold voltage in Step S7 and a return is made to Step 51 to resume the pulse output if the polarization voltage V4 is below the threshold value. Also in the operation of FIG. 8, a plurality of threshold values may be provided and at least one of the charge voltage, the charge current and the duty may be variable similar to the operation of FIG. 7.

By employing such a construction, when the non-aqueous electrolyte secondary battery 14 including the heat-resistant layer made of the porous protection film is quickly charged at such a borderline level as not to cause overcharge, a sufficient pulse interval is ensured by extending an interval to the next pulse. In this way, the voltage V4 is measured after the concentration polarization is eliminated and the cell voltage enters the steady state following the end of the pulse application (fall of the pulse), whereby accuracy in detecting the voltage V4, i.e. accuracy in detecting a deterioration degree of the cell can be improved.

[Fourth Embodiment]

Figure 9:
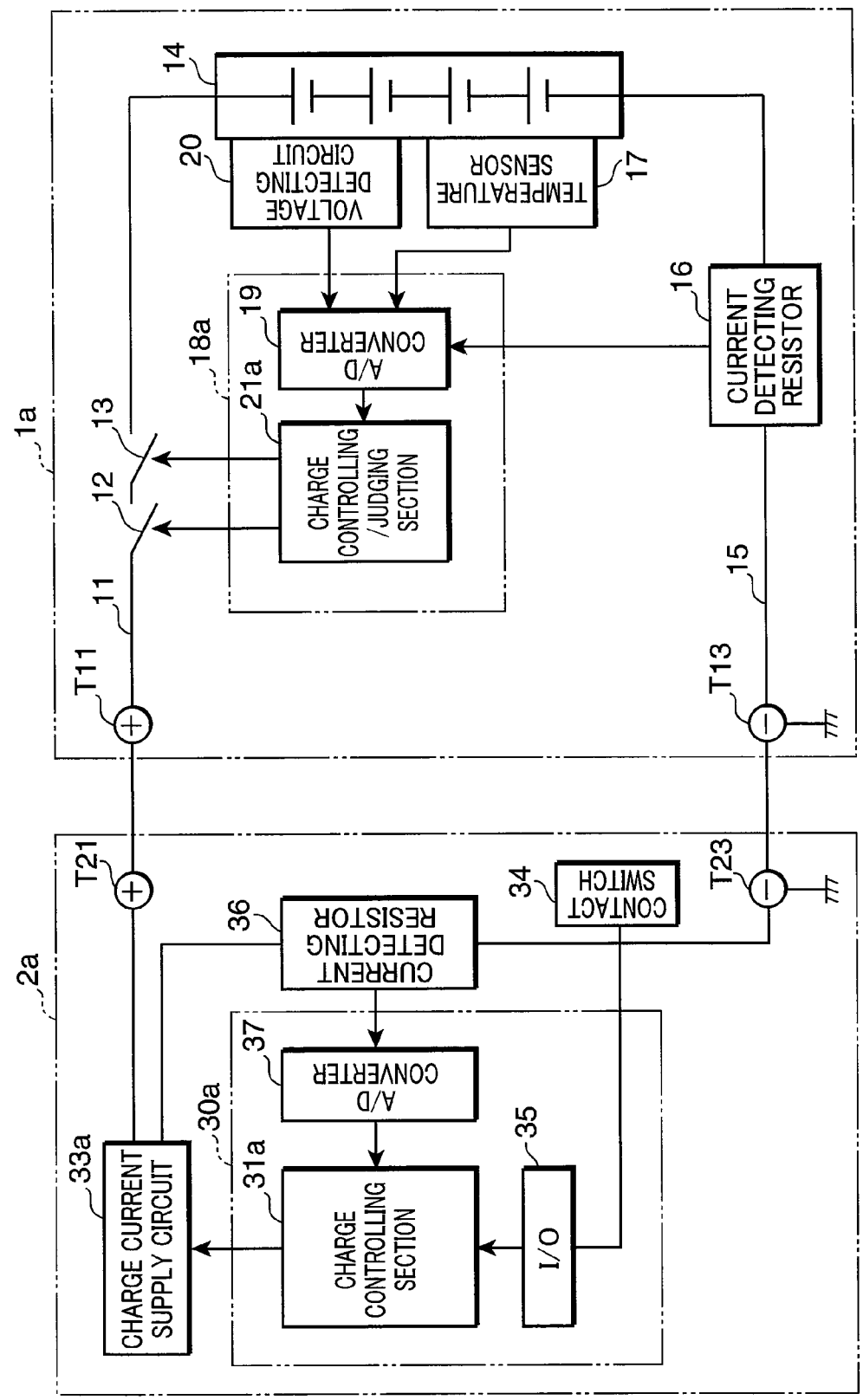
FIG. 9 is a block diagram showing an electrical construction of an electronic device according to a fourth embodiment of the invention.

FIG. 9 is a block diagram showing an electrical construction of an electronic device according to a fourth embodiment of the present invention. This electronic device is similar to the one shown in FIG. 1 and corresponding parts are identified by the same reference numerals and not described. In FIG. 9, the load device 3 is not shown.

What should be noted is that a charging device 2a just outputs a direct current without switching the above high voltage/high current, and a FET 12 (switching element) for charge switches in a battery pack 1a thereby performing pulse charge for a secondary battery 14, and a charge controlling/judging section 21a of the battery pack 1a judges deterioration caused by concentration polarization and terminates the charge.

The charge controlling/judging section 21a functions as a pulse charging section, a polarization detecting section, a deterioration detecting section and a pulse changing section, for example, by implementing a specified control program.

Specifically, the charge controlling/judging section 21a in a control IC 18a detects a charge voltage by means of a voltage detecting circuit 20 or a current detecting resistor 16 via FETS 12, 13, which are ON in a normal state, when a charge current is applied between terminals T11, T13. The charge controlling/judging section 21a causes pulse charge for the secondary battery 14 by switching the FET 12 for charge. The charge controlling/judging section 21a causes the voltage detecting circuit 20 to detect, during the pulse charge, at least one of a voltage V2 produced as the concentration polarization progresses and a voltage V4 produced when the concentration polarization is eliminated. If the voltage detected by the voltage detecting circuit 20 is equal to or above a threshold value of e.g. 0.1 V, the FET 12 is turned off to terminate the pulse charge. In this way, the battery pack 1a is singly quickly charged with a high current while the deterioration of the secondary battery 14 caused by the concentration polarization is suppressed.

Thus, in the charging device 2a, a contact switch 34 is turned on when the battery pack 1a is mounted. A charge controlling section 31a in a control IC 30a causes a charge current supply circuit 33a to output a direct current without switching to the above high voltage/high current upon detecting that the contact switch 34 was turned on via an input/output circuit 35. If the charge is terminated in the battery pack 1a upon the judgment of the concentration polarization, the charge controlling section 31a detects it by means of a current detecting resistor 36 for detecting a charge current and an analog-to-digital converter 37 and causes the charge current supply circuit 33a to stop the supply of the charge current. In such an electronic device, the judgment on the termination of the charge, a protecting operation in response to an abnormality, the detection of the mounted state of the battery pack 1a and the like may be performed in the battery pack 1a using the communicating sections 32, 22 shown in FIG. 1.

[Fifth Embodiment]

FIG. 10 is a block diagram showing an electrical construction of an electronic device according to a fifth embodiment of the present invention. This electronic device is similar to those shown in FIGS. 1 and 9 and corresponding parts are identified by the same reference numerals and not described. In FIG. 10, the load device 3 is not shown.

What should be noted is that a charging device 2b outputs a pulse voltage of the above high voltage/high current and stops this pulse output in a specified cycle. The charging device 2b detects a voltage V4 obtained as concentration polarization is eliminated by the stop of the pulse output from a terminal voltage of a battery pack 1b by means of a voltage detecting circuit 38 and terminates the charge if deterioration is judged.

Specifically, in the charging device 2b, a contact switch 34 is turned on when the battery pack 1b is mounted. A charge controlling section 31b in a control IC 30b causes a charge current supply circuit 33b to output a pulse of the above high voltage/high current upon detecting that the contact switch 34 was turned on via an input/output circuit 35. The charge controlling section 31b ensures sufficient pulse intervals by skipping pulses in the specified cycle as described above. Further, the charge controlling section 31b detects a terminal voltage between terminals T21 and T23 by means of a voltage detecting circuit 38 to detect the voltage V4 based on this terminal voltage. The charge controlling section 31b judges the concentration polarization based on the thus obtained voltage V4.

In this way, the charging device 2b can singly perform quick charge with a high current while suppressing the deterioration of the secondary battery 14 caused by the concentration polarization. The terminal voltage of the battery pack 1b includes voltage drops caused by resistance components of FETs 12, 13 and charge/discharge paths 11, 15, but these can be thought to be constant in a very short period for detecting a voltage change associated with the elimination of the concentration polarization. Accordingly, they have no influence on the measurement of the voltage V4 that moderately decreases by the elimination of the concentration polarization after the pulse application is completed.

Here, Japanese Unexamined Patent Publication No. 2000-19234 discloses technology for estimating a battery capacity by inputting a low-frequency detection pulse to a secondary battery, measuring a response voltage signal and comparing a parameter obtained by analyzing this signal and a parameter actually obtained beforehand in relation to the battery capacity by a real-time discharge method.

However, this conventional technology is for estimating the battery capacity by parameterizing SOC dependency of DCIR of a battery. The DCIR of the battery free from concentration polarization is measured by performing a low load discharge of about 0.1 C for a battery capacity, but a DCIR change caused by the concentration polarization is not supposed. The capacity is estimated, but a disclosed charging method gives no indication on how fast the secondary battery can be charged and charge is thought to be general CCCV charge. In contrast, the present invention is designed to detect concentration polarization in real time from a voltage waveform at the time of charge with a high current and suppress deterioration in order to realize quick charge, and is absolutely different.

A non-aqueous electrolyte secondary battery charging method for charging a non-aqueous electrolyte secondary battery including a heat-resistant layer between a negative electrode and a positive electrode according to one aspect of the present invention comprises a pulse charging step of performing pulse charge by applying a pulse to the secondary battery; a polarization detecting step of detecting a change amount of a cell voltage associated with a change in the concentration polarization of a non-aqueous electrolyte as a polarization voltage after the cell voltage is changed due to a voltage drop caused by an internal resistance of the secondary battery when a charge current flowing in the secondary battery changes as an applied state of the pulse changes; and a deterioration detecting step of terminating the pulse charge if the polarization voltage detected in the polarization detecting step increases to or above a predetermined first threshold value.

The heat-resistant layer is preferably a porous protection film including resin binders and inorganic oxide fillers.

According to this construction, the non-aqueous electrolyte secondary battery including the heat-resistant layer (e.g. heat-resistant layer made of a porous protection film including resin binders and inorganic oxide fillers or the like) between the negative electrode and the positive electrode is used.

The inventor of the present application found out that the deterioration of a secondary battery caused by an insulating coating formed by the precipitation of an positive electrode active material on a negative electrode could be reduced since the transfer of the positive electrode active material eluted from the positive electrode to the negative electrode is hindered by the heat-resistant layer by providing such a heat-resistant layer. Thus, even in the case of quickly charging the non-aqueous electrolyte secondary battery with a high current of, e.g. 10 C, the transfer of the positive electrode active material to the negative electrode associated with quick charge is hindered by the heat-resistant layer, wherefore a charging time can be easily shortened by increasing the charge current while suppressing the deterioration of the non-aqueous electrolyte secondary battery.

As for deterioration caused when the concentration of lithium ions dissolved in an electrolyte becomes lower at a positive electrode side and higher at a negative electrode side and lithium, which cannot enter a negative electrode, precipitates on the surface of the negative electrode at the negative electrode side where the concentration is higher, i.e. deterioration caused by the concentration polarization of a non-aqueous electrolyte, a degree of such concentration polarization is monitored and the charge is terminated before the precipitation of the positive electrode active material on the negative electrode progresses upon detecting a certain level or more of the progress of the concentration polarization, whereby it is possible to suppress the precipitation of the positive electrode active material on the negative electrode and reduce the deterioration of the secondary battery.

Since the concentration polarization itself cannot be directly detected, the change amount of the cell voltage associated with the change in the concentration polarization is detected as the polarization voltage and the degree of the concentration polarization is indirectly judged using the polarization voltage. Accordingly, pulse charge is performed and the degree of deterioration caused by the concentration polarization is judged from a change in the cell voltage at the time of starting or completing pulse application, i.e. when an applied state of the pulse changes. Specifically, after the cell voltage suddenly increases up to a voltage determined by the charge current and the internal resistance upon the application of a charge pulse to the secondary battery, the cell voltage is maintained if the concentration polarization is absent. However, if the concentration polarization progresses, the concentration of the electrolyte at the negative electrode side increases by lithium ions having migrated to the negative electrode side and a resistance value of the electrolyte increases to increase the cell voltage.

In contrast, at the time of completing the application of the charge pulse to the secondary battery, after the cell voltage suddenly decreases by a voltage produced as a voltage drop when the charge current flows through the internal resistance, the cell voltage is maintained at this level if the concentration polarization was absent at the time of starting the pulse application. However, if the concentration polarization was present, lithium ions having migrated to the negative electrode side are diffused to reduce the concentration of the electrolyte at the negative electrode side and the resistance value of the electrolyte decreases to reduce the cell voltage as the concentration polarization is eliminated. Accordingly, a voltage change caused by the elimination of the concentration polarization is detected by detecting a voltage change caused by the progress of the concentration polarization (or after a sufficient pulse interval is ensured, for example, by skipping the next pulse), and the pulse charge is terminated, for example, if at least one of these detected voltage changes increases to or above a predetermined threshold value.

In this way, the deterioration of the secondary battery caused by the precipitation of the positive electrode active material on the negative electrode due to the concentration polarization can be reduced. Further, even if concentration polarization occurs because the secondary battery is quickly charged with a high current, the charge is terminated before the concentration polarization progress to a certain degree or more. Thus, a possibility of the precipitation of the positive electrode active material on the negative electrode is reduced, with the result that the charging time can be easily shortened by quickly charging the non-aqueous electrolyte secondary battery at such a borderline level as not to cause overcharge while reducing the deterioration of the non-aqueous electrolyte secondary battery.

The polarization detecting step is preferably a step of detecting a difference between a cell voltage of the secondary battery when the pulse is applied to the secondary battery and a cell voltage upon entering a steady state reached by an increase of the cell voltage after the application of the pulse as the polarization voltage associated with the progress of the concentration polarization of the non-aqueous electrolyte.

According to this construction, if a pulse is applied to the secondary battery, a charge current flows in the secondary battery and a voltage drop instantaneously occurs due to the internal resistance of the secondary battery, whereby the cell voltage increases. Thereafter, the cell voltage gradually increases as the concentration polarization gradually progresses, and the cell voltage enters the steady state when the progress of the concentration polarization stops. Accordingly, by obtaining the difference between the cell voltage instantaneously produced when the pulse was applied to the secondary battery and the cell voltage upon entering the steady state reached after the subsequent increase of the cell voltage, the polarization voltage associated with the progress of the concentration polarization of the non-aqueous electrolyte can be detected.

In the polarization detecting step, a difference between a first cell voltage, which is the cell voltage of the secondary battery when the pulse application to the secondary battery is completed, and a second cell voltage, which is the cell voltage upon entering a steady state reached by a decrease of the cell voltage after the pulse application is completed, may be detected as the polarization voltage associated with the elimination of the concentration polarization of the non-aqueous electrolyte.

According to this construction, when the pulse application to the secondary battery is completed, the charge current flowing in the secondary battery becomes substantially zero and the cell voltage drops by as much as a voltage drop instantaneously caused by the internal resistance of the secondary battery to reach the first cell voltage. Thereafter, the cell voltage gradually decreases as the concentration polarization is gradually eliminated, and the cell voltage enters the steady state at the second cell voltage when the concentration polarization is completely eliminated. Accordingly, by obtaining the difference between the cell voltage reached by an instantaneous drop when the pulse application to the secondary battery was completed and the cell voltage upon entering the steady state reached after the subsequent decrease of the cell voltage, the polarization voltage associated with the elimination of the concentration polarization of the non-aqueous electrolyte can be detected.

When the charge pulse is applied to the secondary battery, the secondary battery is charged by the charge pulse to increase an OCV (open circuit voltage) of the secondary battery. Thus, the polarization voltage associated with the progress of the concentration polarization obtained as described above includes an increase of the cell voltage associated with the charge. On the other hand, when the pulse application to the secondary battery is completed, the cell voltage is not changed by the charge and the polarization voltage associated with the elimination of the concentration polarization obtained as described above does not include a change of the OCV associated with the charge, wherefore accuracy in detecting the polarization voltage can be improved.

The polarization detecting step is preferably a step of detecting the cell voltage after the lapse of a time equal to or longer than a polarization elimination time set beforehand as a time necessary to eliminate the concentration polarization after the detection of the first cell voltage as the second cell voltage.

According to this construction, upon the lapse of the time equal to or longer than the polarization elimination time after the detection of the first cell voltage following the completion of the pulse application to the secondary battery, the concentration polarization is completely eliminated and the cell voltage enters the steady state. Therefore, the cell voltage upon entering the steady state reached by the decrease of the cell voltage can be easily detected as the second cell voltage.

The pulse charging step is preferably a step of extending a pulse interval to or longer than the polarization elimination time when the polarization voltage is detected in the polarization detecting step while performing the pulse charge by applying the pulse to the secondary battery in a specified cycle.

According to this construction, a possibility of being unable to correctly detect the second cell voltage because the next pulse is applied to the secondary battery before the concentration polarization is completely eliminated after the pulse application to the secondary battery is completed is reduced.

The above step of detecting the voltage change caused by the change in the concentration polarization is a step of detecting a voltage change caused by the progress of the concentration polarization of the non-aqueous electrolyte after the cell voltage is increased by the charge current and the internal resistance upon the pulse application and includes a step of detecting a voltage change caused by the elimination of the concentration polarization of the non-aqueous electrolyte after the cell voltage decreases by a voltage drop caused by the charge current and the internal resistance upon completing the pulse application and a step of correcting the threshold value using the voltage change caused by the elimination of the concentration polarization.

According to the above construction, upon judging the degree of deterioration caused by the concentration polarization of the non-aqueous electrolyte, a change of an OCV (open circuit voltage) associated with the charge is included when the voltage increases due to the progress of the concentration polarization, whereas no change of the OCV is included when the voltage decreases due to the elimination of the concentration polarization (diffusion) appearing after the cell voltage suddenly decreases by the voltage drop caused by the charge current and the internal resistance upon completing the pulse application and, hence, accurate judgment can be made.

Thus, by correcting the threshold value using the voltage change at the time of eliminating the concentration polarization (diffusion), the termination of the pulse charge can be more accurately judged.

The polarization detecting step preferably includes a step of detecting a difference between the cell voltage of the secondary battery when the pulse is applied to the secondary battery and the cell voltage upon entering a steady state by an increase of the cell voltage after the pulse application as a voltage $\alpha$; a step of calculating an accumulated polarization voltage $V_{ca}$ produced by the concentration polarization caused by one previous pulse in accordance with the following equation (a) if A denotes a polarization relaxation coefficient set beforehand as an inclination of a voltage curve of the cell voltage when the concentration polarization is eliminated, B a first cell voltage, which is the cell voltage of the secondary battery when the pulse application to the secondary battery is completed and T a time from the end of one previous pulse application to the start of the pulse application this time; and a step of calculating the polarization voltage $V_c$ in accordance with the following equation (b) if $V_c$ denotes the polarization voltage.

$$V_{ca}=B-A\cdot T \qquad (a)$$

$$V_c=\alpha+V_{ca} \qquad (b)$$

According to this construction, the difference between the cell voltage of the secondary battery when the pulse is applied to the secondary battery and the cell voltage upon entering the steady state by the increase of the cell voltage after the pulse application is detected as the voltage $\alpha$. Then, the accumulated polarization voltage $V_{ca}$ produced by the remaining concentration polarization caused by the one previous pulse is calculated in accordance with equation (a). Further, since the polarization voltage $V_c$ is obtained by correcting the voltage $\alpha$ in accordance with the accumulated polarization voltage $V_{ca}$ and equation (b), accuracy in detecting the polarization voltage can be more improved than in the case of directly obtaining the polarization voltage associated with the progress of the concentration polarization as the voltage $\alpha$.

It is preferable to further comprise a pulse changing step of reducing at least one of a charge voltage, a charge current and a pulse width in the pulse charging step if the polarization voltage detected in the polarization detecting step increases to or above a second threshold value set to a voltage value smaller than the first threshold value.

According to this construction, at least one of the charge voltage, charge current and pulse width of the charge pulse is reduced when the polarization voltage increases to or above the second threshold value, i.e. the concentration polarization of the secondary battery progresses. Therefore, the progress of the deterioration caused by the concentration polarization of the secondary battery is reduced.

It is preferable that a plurality of second threshold values are provided; and that the pulse changing step is a step of reducing at least one of the charge voltage, charge current and pulse width every time the polarization voltage detected in the polarization detecting step increases to or above each second threshold value in an increasing process.

According to this construction, since at least one of the charge voltage, the charge current and the pulse width gradually decreases as the polarization voltage increases with the progress of the concentration polarization of the secondary battery, a charging condition can be finely changed according to the degree of the concentration polarization of the secondary battery. As a result, a possibility of excessively increasing the charging time by excessively reducing a charging charge amount per unit time can be reduced.

There may be further provided a step of terminating the pulse charge as described above when the polarization voltage increases to or above a maximum one of a plurality of threshold values and reducing at least one of the charge voltage, the charge current and the pulse width every time the polarization voltage increases to or above each threshold value below the maximum threshold value.

According to the above construction, after quick charge is performed up to a certain level (SOC) while the deterioration of the secondary battery caused by the concentration polarization is suppressed as described above, an amount of electric charges injected per unit time decreases and the charging time becomes longer (sufficiently shorter as compared with conventional CCCV charge), but the secondary battery can be nearly fully charged.

The first threshold value is preferably 0.1 V per cell.

According to this construction, even if any one of a pulse ON time, a pulse cycle and a duty is arbitrarily changed, a cycle characteristic is suddenly deteriorated if the resulting polarization voltage increases to or above 0.1 V per cell. Therefore, 0.1 V per cell is preferable as a threshold value.

Further, it is preferable that a maximum value of the voltage of the pulse is 4.5 V; that a maximum value of the current thereof is 50 A; that a maximum value of a pulse width is 1 sec; that a minimum value of a pulse cycle is 3 sec; and that a maximum value of a pulse duty is 33%.

According to this construction, the polarization voltage can be suppressed to about 0.1 V per cell.

An electronic device according to one aspect of the present invention comprises a battery pack including a non-aqueous electrolyte secondary battery having a heat-resistant layer between a positive electrode and a negative electrode; a charging device including a charge current supplying section and a charge controlling section for charging the secondary battery; and a load device to be driven by the secondary battery, wherein the battery pack includes a voltage detecting section for detecting a cell voltage of the secondary battery and a transmitting section for transmitting a detection result of the voltage detecting section to the charging device; the charging device includes a receiving section for receiving the cell voltage from the transmitting section; and the charge controlling section includes a pulse charging section for performing pulse charge by applying a pulse to the secondary battery by means of the charge current supplying section, a polarization detecting section for causing the receiving section to receive the cell voltage detected by the voltage detecting section and detecting a change amount of the cell voltage received by the receiving section associated with a change in concentration polarization of a non-aqueous electrolyte as a polarization voltage after the cell voltage received by the receiving section is changed due to a voltage drop caused by an internal resistance of the secondary battery when a charge current flowing in the secondary battery changes as an applied state of the pulse changes, and a deterioration detecting section for terminating the pulse charge by the pulse charging section if the polarization voltage detected by the polarization detecting section increases to or above a predetermined first threshold value.

An electronic device according to one aspect of the present invention comprises a battery pack including a non-aqueous electrolyte secondary battery having a heat-resistant layer between a positive electrode and a negative electrode; a charging device including a charge current supplying section and a charge controlling section for charging the non-aqueous electrolyte secondary battery; and a load device to be driven by the non-aqueous electrolyte secondary battery, wherein the battery pack includes a voltage detecting section for detecting a cell voltage and a transmitting section for transmitting a detection result of the voltage detecting section to the charging device; the charging device includes a receiving section for receiving the cell voltage from the transmitting section; and the charge controlling section causes the charge current supplying section to perform pulse charge, receives a cell voltage detected by the voltage detecting section upon the application of the pulse, and causes the charge current supplying section to terminate the pulse charge if at least one of a voltage change associated with the progress of concentration polarization of the non-aqueous electrolyte appearing after an increase of the cell voltage by as much as a voltage change caused by a charge current and an internal resistance and a voltage change associated with the elimination of the concentration polarization of the non-aqueous electrolyte after a decrease of the cell voltage by as much as a voltage change caused by the charge current and the internal resistance upon the completion of the pulse application increases to or above a predetermined threshold value.

According to this construction, upon quickly charging a non-aqueous electrolyte secondary battery including a heat-resistant layer arranged between a negative electrode and a positive electrode and made of a porous protection film or the like including resin binders and inorganic oxide fillers with such a high current of e.g. 10 C, deterioration caused by overcharge can be prevented in such a secondary battery by blocking an eluted positive electrode active material by means of the heat-resistant layer made of the porous protection film or the like. Accordingly, in order to quickly charge this non-aqueous electrolyte secondary battery at such a borderline level as not to cause overcharge, deterioration caused by concentration polarization of a non-aqueous electrolyte may be monitored and, in the present invention, pulse charge is performed on the non-aqueous electrolyte secondary battery of the battery pack by the charge current supplying section of the charging device, a change of the cell voltage in response to the application of a pulse voltage is detected by the voltage detecting section of the battery pack and transmitted to the receiving section of the charging device by the transmitting section of the battery pack, and a degree of deterioration caused by the concentration polarization is judged by the charge controlling section from the change of the cell voltage in response to the voltage application during the pulse charge.

Specifically, after the cell voltage suddenly increases to the voltage determined by the charge current and the internal resistance upon the pulse application, this voltage is maintained if no concentration polarization is present. However, if the concentration polarization progresses, the concentration of the electrolyte at a negative electrode side increases due to lithium ions having migrated to the negative electrode side and resistance increases to increase the cell voltage. Accordingly, the charge controlling section detects the voltage change associated with the progress of the concentration polarization and terminates the pulse charge if the voltage change increases to or above the predetermined threshold value. In addition or alternatively, at the time of completing the pulse application, after the cell voltage suddenly decreases by as much as a voltage determined by the charge current and the internal resistance, this voltage is maintained if no concentration polarization was initially present at the time of starting the pulse application. If the concentration polarization was present, lithium ions having migrated to the negative electrode side are diffused to reduce the concentration of the electrolyte at the negative electrode side and the resistance decreases to reduce the cell voltage as the concentration polarization is eliminated. Thus, after causing the charge current supplying section to ensure a sufficient pulse interval, for example, by skipping the next pulse, the charge controlling section detects a voltage change caused by the elimination of the concentration polarization, and terminates the pulse charge if the detected voltage change increases to or above the predetermined threshold value.

Accordingly, the secondary battery can be quickly charged with a high current while the deterioration thereof caused by the concentration polarization is suppressed. Further, upon judging a degree of deterioration caused by the concentration polarization of the non-aqueous electrolyte, a change of an OCV (open circuit voltage) associated with the charge is included when the voltage increases due to the pulse application, whereas no change of the OCV is included when the voltage decreases due to the completion of the pulse application and, hence, accurate judgment can be made.

A battery pack according to one aspect of the present invention comprises a non-aqueous electrolyte secondary battery including a heat-resistant layer between a positive electrode and a negative electrode; a voltage detecting section for detecting a cell voltage of the secondary battery; a switching element for switching a charge current from an externally connected charging device, thereby applying a pulse to the secondary battery to perform pulse charge; a polarization detecting section for detecting a change amount of the cell voltage associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes; and a deterioration detecting section for stopping the switching of the switching element to terminate the pulse charge if the polarization voltage detected by the polarization detecting section increases to or above a predetermined first threshold value.

Further, a battery pack according to one aspect of the present invention comprises a non-aqueous electrolyte secondary battery including a heat-resistant layer between a positive electrode and a negative electrode; a voltage detecting section for detecting a cell voltage of the secondary battery; a switching element for switching a charge current from a charging device, thereby performing pulse charge on the secondary battery to perform pulse charge; and a charge controlling section for monitoring the cell voltage detected by the voltage detecting section and stopping the switching of the switching element to terminate the pulse charge if at least one of a voltage change caused by the progress of concentration polarization of the non-aqueous electrolyte appearing after an increase of the cell voltage up to a voltage determined by a charge current and an internal resistance upon the pulse application and a voltage change caused by the elimination of the concentration polarization of the non-aqueous electrolyte after a decrease of the cell voltage by as much as a voltage determined by the charge current and the internal resistance increases to or above a predetermined threshold value.

According to this construction, upon quickly charging a non-aqueous electrolyte secondary battery including a heat-resistant layer arranged between a negative electrode and a positive electrode and made of a porous protection film or the like including resin binders and inorganic oxide fillers with such a high current of e.g. 10 C, deterioration caused by overcharge can be prevented in such a secondary battery by blocking an eluted positive electrode active material by means of the heat-resistant layer made of the porous protection film or the like. Accordingly, in order to quickly charge this non-aqueous electrolyte secondary battery at such a borderline level as not to cause overcharge, deterioration caused by concentration polarization of a non-aqueous electrolyte may be monitored and, in the present invention, it is sufficient for the charging device only to supply the high current, the switching element switches the charge current in the battery pack to perform the pulse charge on the non-aqueous electrolyte secondary battery, a change of the cell voltage in response to the application of a pulse voltage is detected by the voltage detecting section, and a degree of deterioration caused by the concentration polarization is judged by the charge controlling section from the change of the cell voltage in response to the voltage application during the pulse charge.

Specifically, after the cell voltage suddenly increases to the voltage determined by the charge current and the internal resistance upon the pulse application, this voltage is maintained if no concentration polarization is present. However, if the concentration polarization progresses, the concentration of the electrolyte at a negative electrode side increases due to lithium ions having migrated to the negative electrode side and a resistance increases to increase the cell voltage. Accordingly, the charge controlling section detects the voltage change associated with the progress of the concentration polarization and stops the switching of the switching element to terminate the pulse charge if the voltage change increases to or above the predetermined threshold value. In addition or alternatively, at the time of completing the pulse application, after the cell voltage suddenly decreases by as much as a voltage determined by the charge current and the internal resistance, this voltage is maintained if no concentration polarization was initially present at the time of starting the pulse application. If the concentration polarization was present, lithium ions having migrated to the negative electrode side are diffused to reduce the concentration of the electrolyte at the negative electrode side and the resistance decreases to reduce the cell voltage as the concentration polarization is eliminated. Thus, after ensuring a sufficient pulse interval, for example, by pausing the switching of the switching element, the charge controlling section detects a voltage change caused by the elimination of the concentration polarization and terminates the pulse charge if the detected voltage change increases to or above the predetermined threshold value.

Accordingly, the secondary battery can be quickly charged with a high current while the deterioration thereof caused by the concentration polarization is suppressed. Further, upon judging a degree of deterioration caused by the concentration polarization of the non-aqueous electrolyte, a change of an OCV (open circuit voltage) associated with the charge is included when a sharing voltage increases due to the pulse application, whereas no change of the OCV is included when the voltage decreases due to the completion of the pulse application and, hence, accurate judgment can be made.

Further, a charging device according to one aspect of the present invention comprises a charge current supplying section for charging a battery pack including a non-aqueous electrolyte secondary battery having a heat-resistant layer between a negative electrode and a positive electrode; a charge controlling section for controlling the charge current supplying section; and a voltage detecting section for detecting a terminal voltage of the battery pack, wherein the charge controlling section includes a pulse charging section for performing pulse charge by applying a pulse to the secondary battery by means of the charge current supplying section, a polarization detecting section for detecting a voltage change amount associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes, and a deterioration detecting section for terminating the pulse charge by the pulse charging section if the polarization voltage detected by the polarization detecting section increases to or above a predetermined first threshold value.

Furthermore, a charging device according to one aspect of the present invention for charging a battery pack including a non-aqueous electrolyte secondary battery having a heat-resistant layer between a negative electrode and a positive electrode comprises a charge current supplying section; a charge controlling section; and a voltage detecting section for detecting a terminal voltage of the battery pack, wherein the charge controlling section monitors the terminal voltage detected by the voltage detecting section upon the application of a pulse while causing the charge current supplying section to perform pulse charge on the secondary battery, and causes the charge current supplying section to terminal the pulse charge if a sharing voltage caused by the elimination of concentration polarization of the non-aqueous electrolyte increases to or above a predetermined threshold value after the terminal voltage decreases by as much as a voltage determined by a charge current and an internal resistance upon the completion of the pulse application.

According to this construction, upon quickly charging a non-aqueous electrolyte secondary battery including a heat-resistant layer made of a porous protection film or the like including resin binders and inorganic oxide fillers and arranged between a negative electrode and a positive electrode with such a high current of e.g. 10 C, deterioration caused by overcharge can be prevented in such a secondary battery by blocking an eluted positive electrode active material by means of the heat-resistant layer made of the porous protection film or the like. Accordingly, in order to quickly charge this non-aqueous electrolyte secondary battery at such a borderline level as not to cause overcharge, deterioration caused by concentration polarization of a non-aqueous electrolyte may be monitored and, in the present invention, the charge current supplying section of the charging device performs the pulse charge on the non-aqueous electrolyte secondary battery of the battery pack, the voltage detecting section detects the change of the terminal voltage of the battery pack in response to the application of a pulse voltage and the charge controlling section judges a degree of deterioration caused by the concentration polarization from the change of the terminal voltage in response to the voltage application during the pulse charge.

Specifically, after the cell voltage suddenly increases to the voltage determined by the charge current and the internal resistance upon the pulse application, this voltage is maintained if no concentration polarization is present. However, if the concentration polarization progresses, the concentration of the electrolyte at a negative electrode side increases due to lithium ions having migrated to the negative electrode side and a resistance increases to increase the cell voltage. On the other hand, at the time of completing the pulse application, after the cell voltage suddenly decreases by as much as a voltage determined by the charge current and the internal resistance, this voltage is maintained if no concentration polarization was initially present at the time of starting the pulse application. If the concentration polarization was present, lithium ions having migrated to the negative electrode side are diffused to reduce the concentration of the electrolyte at the negative electrode side and the resistance decreases to reduce the cell voltage as the concentration polarization is eliminated. Thus, after ensuring a sufficient pulse interval, for example, by causing the charge current supplying section to skip the next pulse, the charge controlling section detects a voltage change caused by the elimination of the concentration polarization from the terminal voltage of the battery pack and terminates the pulse charge if the detected voltage change increases to or above the predetermined threshold value.

Accordingly, the secondary battery can be quickly charged with a high current while the deterioration thereof caused by the concentration polarization is suppressed. Further, upon judging a degree of deterioration caused by the concentration polarization of the non-aqueous electrolyte, a change of an OCV (open circuit voltage) associated with the charge is included when the voltage increases due to the application of the pulse voltage, whereas no change of the OCV is included when the voltage decreases due to the completion of the pulse application and, hence, accurate judgment can be made.

As described above, upon charging a non-aqueous electrolyte secondary battery including a heat-resistant layer arranged between a negative electrode and a positive electrode and made of a porous protection film including resin binders and inorganic oxide fillers and resistant to overvoltage and overcurrent, pulse charge is performed as an operation of a battery pack, an operation of a charging device or a cooperative operation of the battery pack and the charging device, a degree of concentration polarization is judged from a voltage change at least either during the progress of the concentration polarization or during the elimination of the concentration polarization, and the pulse charge is performed with high voltage/high current until a specified threshold value is reached. Therefore, it becomes easy to quite effectively perform quick charge on the secondary battery as described above.

What is claimed is:

1. A charging method for charging a non-aqueous electrolyte secondary battery, the method comprising:
   a pulse charging step of performing pulse charge by applying a pulse to a secondary battery;
   a polarization detecting step of detecting a change amount of a cell voltage associated with a change in the concentration polarization of a non-aqueous electrolyte as a polarization voltage after the cell voltage is changed due to a voltage drop caused by an internal resistance of the secondary battery when a charge current flowing in the secondary battery changes as an applied state of the pulse changes; and
   a deterioration detecting step of terminating the pulse charge if the polarization voltage detected in the polarization detecting step increases to or above a predetermined first threshold value, wherein:
   the polarization detecting step includes a step of detecting a difference between a first cell voltage, which is the cell voltage of the secondary battery when the pulse application to the secondary battery is completed, and a second cell voltage, which is the cell voltage upon entering a steady state reached by a decrease of the cell voltage after the pulse application is completed as the polarization voltage associated with the elimination of the concentration polarization of the non-aqueous electrolyte, and a step of detecting the cell voltage after the lapse of a time equal to or longer than a polarization elimination time set beforehand as a time necessary to eliminate the concentration polarization after the detection of the first cell voltage as the second cell voltage, and
   the pulse charging step includes a step of extending a pulse interval to or longer than the polarization elimination time when the polarization voltage is detected in the polarization detecting step while performing the pulse charge by applying the pulse to the secondary battery in a specified cycle, the polarization elimination time being longer than a time period during which the pulse output is paused in the specified cycle.

2. A charging method for charging a non-aqueous electrolyte secondary battery, the method comprising:

a pulse charging step of performing pulse charge by applying a pulse to a secondary battery;

a polarization detecting step of detecting a change amount of a cell voltage associated with a change in the concentration polarization of a non-aqueous electrolyte as a polarization voltage after the cell voltage is changed due to a voltage drop caused by an internal resistance of the secondary battery when a charge current flowing in the secondary battery changes as an applied state of the pulse changes; and a deterioration detecting step of terminating the pulse charge if the polarization voltage detected in the polarization detecting step increases to or above a predetermined first threshold value, wherein the polarization detecting step includes:

a step of detecting a difference between the cell voltage of the secondary battery when the pulse is applied to the secondary battery and the cell voltage upon entering a steady state by an increase of the cell voltage after the pulse application as a voltage α;

a step of calculating an accumulated polarization voltage Vca produced by the concentration polarization caused by one previous pulse in accordance with the following equation (a) if A denotes a polarization relaxation coefficient set beforehand as an inclination of a voltage curve of the cell voltage when the concentration polarization is eliminated, B a first cell voltage, which is the cell voltage of the secondary battery when the pulse application to the secondary battery is completed and T a time from the end of one previous pulse application to the start of the pulse application this time; and a step of calculating the polarization voltage Vc in accordance with the following equation (b) if Vc denotes the polarization voltage:

$$Vca = B - A \cdot T \tag{a}$$

$$Vc = \alpha + Vca \tag{b}$$

3. An electronic device, comprising:

a battery pack including secondary battery;

a charging device including a charge current supplying section and a charge controlling section for charging the secondary battery; and a load device to be driven by the secondary battery, wherein:

the battery pack includes a voltage detecting section for detecting a cell voltage of the secondary battery and a transmitting section for transmitting a detection result of the voltage detecting section to the charging device, the charging device includes a receiving section for receiving the cell voltage from the transmitting section, the charge controlling section includes:

a pulse charging section for performing pulse charge by applying a pulse to the secondary battery by means of the charge current supplying section;

a polarization detecting section for causing the receiving section to receive the cell voltage detected by the voltage detecting section and detecting a change amount of the cell voltage received by the receiving section associated with a change in concentration polarization of a non-aqueous electrolyte as a polarization voltage after the cell voltage received by the receiving section is changed due to a voltage drop caused by an internal resistance of the secondary battery when a charge current flowing in the secondary battery changes as an applied state of the pulse changes; and a deterioration detecting section for terminating the pulse charge by the pulse charging section if the polarization voltage detected by the polarization detecting section increases to or above a predetermined first threshold value, the polarization detecting section:

detects a difference between the cell voltage of the secondary battery when the pulse is applied to the secondary battery and the cell voltage upon entering a steady state by an increase of the cell voltage after the pulse application as a voltage α;

calculates an accumulated polarization voltage Vca produced by the concentration polarization caused by one previous pulse in accordance with the following equation (a) when A denotes a polarization relaxation coefficient set beforehand as an inclination of a voltage curve of the cell voltage when the concentration polarization is eliminated, B denotes a first cell voltage, which is the cell voltage of the secondary battery when the pulse application to the secondary battery is completed and T denotes a time from the end of one previous pulse application to the start of the pulse application this time; and calculates the polarization voltage Vc in accordance with the following equation (b) when Vc denotes the polarization voltage:

$$Vca = B - A \cdot T \tag{a}$$

$$Vc = \alpha + Vca \tag{b}$$

4. A battery pack, comprising:

a non-aqueous electrolyte secondary battery;

a voltage detecting section for detecting a cell voltage of the secondary battery;

a switching element for switching a charge current from an externally connected charging device, thereby applying a pulse to the secondary battery to perform pulse charge;

a polarization detecting section for detecting a change amount of the cell voltage associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes; and a deterioration detecting section for stopping the switching of the switching element to terminate the pulse charge if the polarization voltage detected by the polarization detecting section increases to or above a predetermined first threshold value, wherein the polarization detecting section:

detects a difference between the cell voltage of the secondary battery when the pulse is applied to the secondary battery and the cell voltage upon entering a steady state by an increase of the cell voltage after the pulse application as a voltage α;

calculates an accumulated polarization voltage Vca produced by the concentration polarization caused by one previous pulse in accordance with the following equation (a) when A denotes a polarization relaxation coefficient set beforehand as an inclination of a voltage curve of the cell voltage when the concentration polarization is eliminated, B denotes a first cell voltage, which is the cell voltage of the secondary battery when the pulse application to the secondary battery is completed and T denotes a time from the end of one previous pulse application to the start of the pulse application this time; and calculates the polarization voltage Vc in accordance with the following equation (b) when Vc denotes the polarization voltage:

$$Vca = B - A \cdot T \tag{a}$$

$$Vc = \alpha + Vca \tag{b}$$

5. A charging device, comprising:

a charge current supplying section for charging a battery pack including a non-aqueous electrolyte secondary battery;

a charge controlling section for controlling the charge current supplying section; and a voltage detecting section for detecting a terminal voltage of the battery pack, wherein the charge controlling section including:

a pulse charging section for performing pulse charge by applying a pulse to the secondary battery by means of the charge current supplying section;

a polarization detecting section for detecting a voltage change amount associated with a change in concentration polarization of the non-aqueous electrolyte as a polarization voltage based on the cell voltage detected by the voltage detecting section after the cell voltage is changed due to a voltage drop caused by an internal resistance of the secondary battery when a charge current flowing in the secondary battery changes as an applied state of the pulse changes; and a deterioration detecting section for terminating the pulse charge by the pulse charging section if the polarization voltage detected by the polarization detecting section increases to or above a predetermined first threshold value, and the polarization detecting section:

detects a difference between the cell voltage of the secondary battery when the pulse is a lied to the secondar batter and the cell voltage e on entering a stead state b an increase of the cell voltage after the pulse application as a voltage $\alpha$;

calculates an accumulated polarization voltage Vca produced by the concentration polarization caused by one previous pulse in accordance with the following equation (a) when A denotes a polarization relaxation coefficient set beforehand as an inclination of a voltage curve of the cell voltage when the concentration polarization is eliminated, B denotes a first cell voltage, which is the cell voltage of the secondary battery when the pulse application to the secondary battery is completed and T denotes a time from the end of one previous pulse application to the start of the pulse application this time; and calculates the polarization voltage Vc in accordance with the following equation (b) when Vc denotes the polarization voltage:

$$Vca = B - A \cdot T \tag{a}$$

$$Vc = \alpha + Vca \tag{b}$$

\* \* \* \* \*